US009341790B2

(12) United States Patent
Graves

(10) Patent No.: US 9,341,790 B2
(45) Date of Patent: May 17, 2016

(54) DEVICE AND METHOD FOR MICRO-ELECTRO-MECHANICAL-SYSTEM PHOTONIC SWITCH

(71) Applicant: Huawei Technologies Co., Ltd., Shenzhen (CN)

(72) Inventor: Alan Frank Graves, Kanata (CA)

(73) Assignee: Huawei Technologies Co., LTD., Shenzhen (CN)

(*) Notice: Subject to any disclaimer, the term of this patent is extended or adjusted under 35 U.S.C. 154(b) by 145 days.

(21) Appl. No.: 14/203,328

(22) Filed: Mar. 10, 2014

(65) Prior Publication Data
US 2015/0253567 A1 Sep. 10, 2015

(51) Int. Cl.
*G02B 26/08* (2006.01)
*G02B 6/35* (2006.01)

(52) U.S. Cl.
CPC ............ *G02B 6/3584* (2013.01); *G02B 6/3556* (2013.01); *G02B 26/0841* (2013.01); *G02B 6/3512* (2013.01)

(58) Field of Classification Search
CPC ............ B81B 7/0067; G02B 26/0841; G02B 26/0833; G02B 6/3512; G02B 6/3584
USPC ................................ 359/199.3, 223.1–226.1
See application file for complete search history.

(56) References Cited

U.S. PATENT DOCUMENTS

| 6,574,026 B2* | 6/2003 | Jin | G02B 26/0841 359/224.1 |
| 7,012,266 B2* | 3/2006 | Jin | H01J 37/3177 250/423 R |
| 2005/0045727 A1 | 3/2005 | Fu | |
| 2005/0220394 A1 | 10/2005 | Yamamoto et al. | |

FOREIGN PATENT DOCUMENTS

| CN | 102306583 A | 1/2012 |
| CN | 102608758 A | 7/2012 |

OTHER PUBLICATIONS

Yamaguchi, J., et al., "High-yield Fabrication Methods for MEMS Tilt Mirror Array for Optical Switches," Selected Papers: MEMS Device Technologies, NTT Technical Review, Oct. 2007, vol. 5, No. 10, 6 pages.

(Continued)

*Primary Examiner* — Euncha Cherry
(74) *Attorney, Agent, or Firm* — Slater Matsil, LLP

(57) ABSTRACT

In one embodiment, micro-electro-mechanical-system (MEMS) mirror structure includes an electrode plate including a first deflection electrode and a second deflection electrode, where the second deflection electrode is opposite the first deflection electrode, where the first deflection electrode is configured to receive a first drive voltage, and where the second deflection electrode is configured to receive a second drive voltage. The MEMS mirror structure also includes a mirror support pillar disposed on the electrode plate, where the mirror support pillar has a bearing surface and a mirror disposed above the bearing surface of the support pillar, where the mirror has a deflection angle, and where the first voltage is nonzero when the deflection angle is zero.

24 Claims, 22 Drawing Sheets

(56) References Cited

OTHER PUBLICATIONS

Yamamoto, T., et al., "Development of a Large-scale 3D MEMS Optical Switch Module," Selected Papers. NTT Technical Review, Vol. 1, No. 7, Oct. 2003, 6 pages.

International Seach Report of Patent Cooperation Treaty (PCT), International Application No. PCT/CN2015/073795, Applicant Huawei Technologies Co., Ltd., date of mailing May 29, 2015, 13 pages.

* cited by examiner

Legend: ▨ MIGRATION <1%  ▨ MIGRATION 1-2%  ▨ MIGRATION 2-3%  ▨ MIGRATION 3-5%  ▨ MIGRATION >5%

Table 540:

| ANGLE OF DEFLECTION (DEGREES) | RADIUS OF PIVOT (MILLIMETERS) | | | | | | | |
|---|---|---|---|---|---|---|---|---|
| | 0.02 | 0.025 | 0.03 | 0.04 | 0.05 | 0.06 | 0.07 | 0.08 |
| 0 | 0.00 | 0.00 | 0.00 | 0.00 | 0.00 | 0.00 | 0.00 | 0.00 |
| 1 | 0.70 | 0.87 | 1.05 | 1.40 | 1.75 | 2.09 | 2.44 | 2.79 |
| 2 | 1.40 | 1.74 | 2.09 | 2.79 | 3.49 | 4.19 | 4.89 | 5.58 |
| 3 | 2.09 | 2.62 | 3.14 | 4.19 | 5.23 | 6.28 | 7.33 | 8.37 |
| 4 | 2.79 | 3.49 | 4.19 | 5.58 | 6.98 | 8.37 | 9.77 | 11.16 |
| 5 | 3.49 | 4.36 | 5.23 | 6.97 | 8.71 | 10.46 | 12.20 | 13.94 |
| 6 | 4.18 | 5.23 | 6.27 | 8.36 | 10.45 | 12.54 | 14.63 | 16.72 |
| 7 | 4.87 | 6.09 | 7.31 | 9.75 | 12.19 | 14.62 | 17.06 | 19.50 |
| 8 | 5.57 | 6.96 | 8.35 | 11.13 | 13.92 | 16.70 | 19.48 | 22.27 |
| 9 | 6.26 | 7.82 | 9.39 | 12.51 | 15.64 | 18.77 | 21.90 | 25.03 |
| 10 | 6.95 | 8.68 | 10.42 | 13.89 | 17.36 | 20.84 | 24.31 | 27.78 |
| 11 | 7.63 | 9.54 | 11.45 | 15.26 | 19.08 | 22.90 | 26.71 | 30.53 |
| 12 | 8.32 | 10.39 | 12.47 | 16.63 | 20.79 | 24.95 | 29.11 | 33.26 |

Table 542:

| ANGLE OF DEFLECTION (DEGREES) | RADIUS OF PIVOT (MILLIMETERS) | | | | | | | |
|---|---|---|---|---|---|---|---|---|
| | 0.02 | 0.025 | 0.03 | 0.04 | 0.05 | 0.06 | 0.07 | 0.08 |
| 0 | 0.000 | 0.000 | 0.000 | 0.000 | 0.000 | 0.000 | 0.000 | 0.000 |
| 1 | 0.199 | 0.249 | 0.299 | 0.399 | 0.499 | 0.598 | 0.698 | 0.798 |
| 2 | 0.399 | 0.499 | 0.598 | 0.798 | 0.997 | 1.196 | 1.396 | 1.595 |
| 3 | 0.598 | 0.748 | 0.897 | 1.196 | 1.495 | 1.794 | 2.093 | 2.392 |
| 4 | 0.797 | 0.996 | 1.196 | 1.594 | 1.993 | 2.391 | 2.790 | 3.189 |
| 5 | 0.996 | 1.245 | 1.494 | 1.992 | 2.490 | 2.988 | 3.486 | 3.984 |
| 6 | 1.195 | 1.493 | 1.792 | 2.389 | 2.986 | 3.584 | 4.181 | 4.778 |
| 7 | 1.393 | 1.741 | 2.089 | 2.785 | 3.482 | 4.178 | 4.874 | 5.571 |
| 8 | 1.590 | 1.988 | 2.386 | 3.181 | 3.976 | 4.771 | 5.567 | 6.362 |
| 9 | 1.788 | 2.235 | 2.682 | 3.575 | 4.469 | 5.363 | 6.257 | 7.151 |
| 10 | 1.984 | 2.481 | 2.977 | 3.969 | 4.961 | 5.953 | 6.945 | 7.938 |
| 11 | 2.181 | 2.726 | 3.271 | 4.361 | 5.451 | 6.542 | 7.632 | 8.722 |
| 12 | 2.376 | 2.970 | 3.564 | 4.752 | 5.940 | 7.128 | 8.316 | 9.504 |

| ANGLE OF DEFLECTION | RADIUS OF PIVOT (MILLIMETERS) | | | | | | | | |
|---|---|---|---|---|---|---|---|---|---|
| | 0.02 | 0.025 | 0.03 | 0.04 | 0.05 | 0.06 | 0.07 | 0.08 |
| 0 | 0 | 0 | 0 | 0 | 0 | 0 | 0 | 0 |
| 1 | 0.003 | 0.0038 | 0.0046 | 0.0061 | 0.0076 | 0.0091 | 0.0107 | 0.0122 |
| 2 | 0.0122 | 0.0152 | 0.0183 | 0.0244 | 0.0305 | 0.0366 | 0.0427 | 0.0488 |
| 3 | 0.0274 | 0.0343 | 0.0412 | 0.0549 | 0.0686 | 0.0823 | 0.0961 | 0.1098 |
| 4 | 0.0488 | 0.061 | 0.0732 | 0.0977 | 0.1221 | 0.1465 | 0.1709 | 0.1953 |
| 5 | 0.0764 | 0.0955 | 0.1146 | 0.1528 | 0.191 | 0.2292 | 0.2673 | 0.3055 |
| 6 | 0.1101 | 0.1377 | 0.1652 | 0.2203 | 0.2754 | 0.3304 | 0.3855 | 0.4406 |
| 7 | 0.1502 | 0.1877 | 0.2253 | 0.3003 | 0.3754 | 0.4505 | 0.5256 | 0.6007 |
| 8 | 0.1965 | 0.2457 | 0.2948 | 0.393 | 0.4913 | 0.5896 | 0.6878 | 0.7861 |
| 9 | 0.2493 | 0.3116 | 0.3739 | 0.4985 | 0.6232 | 0.7478 | 0.8724 | 0.9971 |
| 10 | 0.3085 | 0.3856 | 0.4627 | 0.617 | 0.7712 | 0.9255 | 1.0797 | 1.2339 |
| 11 | 0.3743 | 0.4678 | 0.5614 | 0.7486 | 0.9357 | 1.1228 | 1.31 | 1.4971 |
| 12 | 0.4467 | 0.5584 | 0.6701 | 0.8935 | 1.1169 | 1.3402 | 1.5636 | 1.787 |

542 ↙

| ANGLE OF DEFLECTION | RADIUS OF PIVOT (MILLIMETERS) | | | | | | | | |
|---|---|---|---|---|---|---|---|---|---|
| | 0.02 | 0.025 | 0.03 | 0.04 | 0.05 | 0.06 | 0.07 | 0.08 |
| 0 | 0 | 0 | 0 | 0 | 0 | 0 | 0 | 0 |
| 1 | 0.0001 | 0.0001 | 0.0001 | 0.0001 | 0.0001 | 0.0002 | 0.0002 | 0.0002 |
| 2 | 0.0004 | 0.0005 | 0.0006 | 0.0009 | 0.0011 | 0.0013 | 0.0015 | 0.0017 |
| 3 | 0.0014 | 0.0018 | 0.0022 | 0.0029 | 0.0036 | 0.0043 | 0.005 | 0.0058 |
| 4 | 0.0034 | 0.0043 | 0.0051 | 0.0068 | 0.0085 | 0.0102 | 0.012 | 0.0137 |
| 5 | 0.0067 | 0.0084 | 0.01 | 0.0134 | 0.0167 | 0.02 | 0.0234 | 0.0267 |
| 6 | 0.0116 | 0.0145 | 0.0174 | 0.0232 | 0.0289 | 0.0347 | 0.0405 | 0.0463 |
| 7 | 0.0184 | 0.023 | 0.0277 | 0.0369 | 0.0461 | 0.0553 | 0.0645 | 0.0738 |
| 8 | 0.0276 | 0.0345 | 0.0414 | 0.0552 | 0.069 | 0.0829 | 0.0967 | 0.1105 |
| 9 | 0.0395 | 0.0493 | 0.0592 | 0.079 | 0.0987 | 0.1184 | 0.1382 | 0.1579 |
| 10 | 0.0544 | 0.068 | 0.0816 | 0.1088 | 0.136 | 0.1632 | 0.1904 | 0.2176 |
| 11 | 0.0727 | 0.0909 | 0.1091 | 0.1455 | 0.1819 | 0.2182 | 0.2546 | 0.291 |
| 12 | 0.095 | 0.1187 | 0.1424 | 0.1899 | 0.2374 | 0.2849 | 0.3323 | 0.3798 |

FIG. 25

DEVICE AND METHOD FOR MICRO-ELECTRO-MECHANICAL-SYSTEM PHOTONIC SWITCH

TECHNICAL FIELD

The present invention relates to photonics, and, in particular, to a device and method for a micro-electro-mechanical-system (MEMS) photonic switch.

BACKGROUND

A type of photonic switch is a three dimensional (3D) micro-electro-mechanical-system (MEMS) photonic switch. MEMS photonic switches have excellent properties, such as the ability to achieve a high port count. Also, MEMS photonic switches have excellent optical properties, such as low loss, low polarization dependence, high linearity, and low noise. Additionally, MEMS photonic switches have excellent off-state properties, such as high isolation and low crosstalk.

However, MEMS photonic switches have some issues that limit their widespread use, such as slow switching speeds, driven by complex methods of control. This is especially problematic when MEMS photonic switches are used in a cascade configuration, such as in a three stage CLOS switch, or to set up a path transiting multiple nodes across a photonic switched network. Also, control methods may leave residual modulation introduced by the switch, which can interfere with the cascading of the switch.

SUMMARY

An embodiment micro-electro-mechanical-system (MEMS) mirror structure includes an electrode plate including a first deflection electrode and a second deflection electrode, where the second deflection electrode is opposite the first deflection electrode, where the first deflection electrode is configured to receive a first drive voltage, and where the second deflection electrode is configured to receive a second drive voltage. The MEMS mirror structure also includes a mirror support pillar disposed on the electrode plate, where the mirror support pillar has a bearing surface and a mirror disposed above the bearing surface of the support pillar, where the mirror has a deflection angle, and where the first voltage is nonzero when the deflection angle is zero.

An embodiment micro-electro-mechanical-system (MEMS) mirror structure includes a mirror and a first torsion spring coupled to the mirror. The MEMS mirror structure also includes a gimbal ring coupled to the first torsion spring and a first gimbal ring support pillar below the gimbal ring. Additionally, the MEMS mirror structure includes an electrode plate coupled to the first support pillar.

An embodiment method of controlling a micro-electro-mechanical-system (MEMS) mirror includes preventing the MEMS mirror from moving closer to an electrode plate by using a mirror support pillar disposed on the electrode plate below the mirror and preventing the MEMS mirror from moving farther from the electrode plate by applying a first voltage to a first deflection electrode of the electrode plate and a second voltage to a second deflection electrode of the electrode plate, where the first voltage is non-zero.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which:

FIG. 20 illustrates tables of pivot movement and percent change in pivot movement for the angle of deflection and radius of pivot;

FIG. 25 illustrates tables of pivot vertical vibration and pivot horizontal migration.

DETAILED DESCRIPTION OF ILLUSTRATIVE EMBODIMENTS

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

An embodiment includes a micro-electro-mechanical system (MEMS) photonic switch containing mirror arrays where domed pillars are under the center of the mirrors. The pillar provides a mirror/pillar bearing surface over which the mirror can roll. In one embodiment, two additional pillars are placed under the gimbal ring in line with the rotational center of the torsion springs, enabling the gimbal ring to rotate in one plane. These pillars prevent the mirror, and gimbal ring if three pillars are used, from moving towards the electrode plate. To prevent the mirror, and optionally the mirror gimbal, from moving away from an electrode, the mirror drive algorithms are equipped so an electric field between the underlying substrate electrodes and the mirror (and optionally the mirror gimbal) is always present when the mirror is in service. A shallow depression may be at the center of the rear face of the mirror to offset the rotational axis of the gimbal torsion springs towards the underside of the mirror, so the center of the gimbal rotational axis passes through, or just below, the at-rest contact point between the mirror and the bearing sphere. The gimbal ring may be thinned in the vertical axis to provide a reduced restorative torque to increase the mirror deflection sensitivity, which would be problematic without the pillars, since this would also reduce the resistance to whole mirror linear movement towards the electrodes. To prevent the gimbal ring from moving away from the electrode, a voltage applied to an annular electrode or segment of an annular electrode underneath the gimbal ring may provide a downward force.

A three-dimensional (3D) MEMS photonic switch may use one or two arrays of steerable mirrors to form switchable optical paths between collimator arrays. When one mirror array is used, the mirror array is arranged opposite a static planar or near planar retro-reflective mirror.

Figure 1:
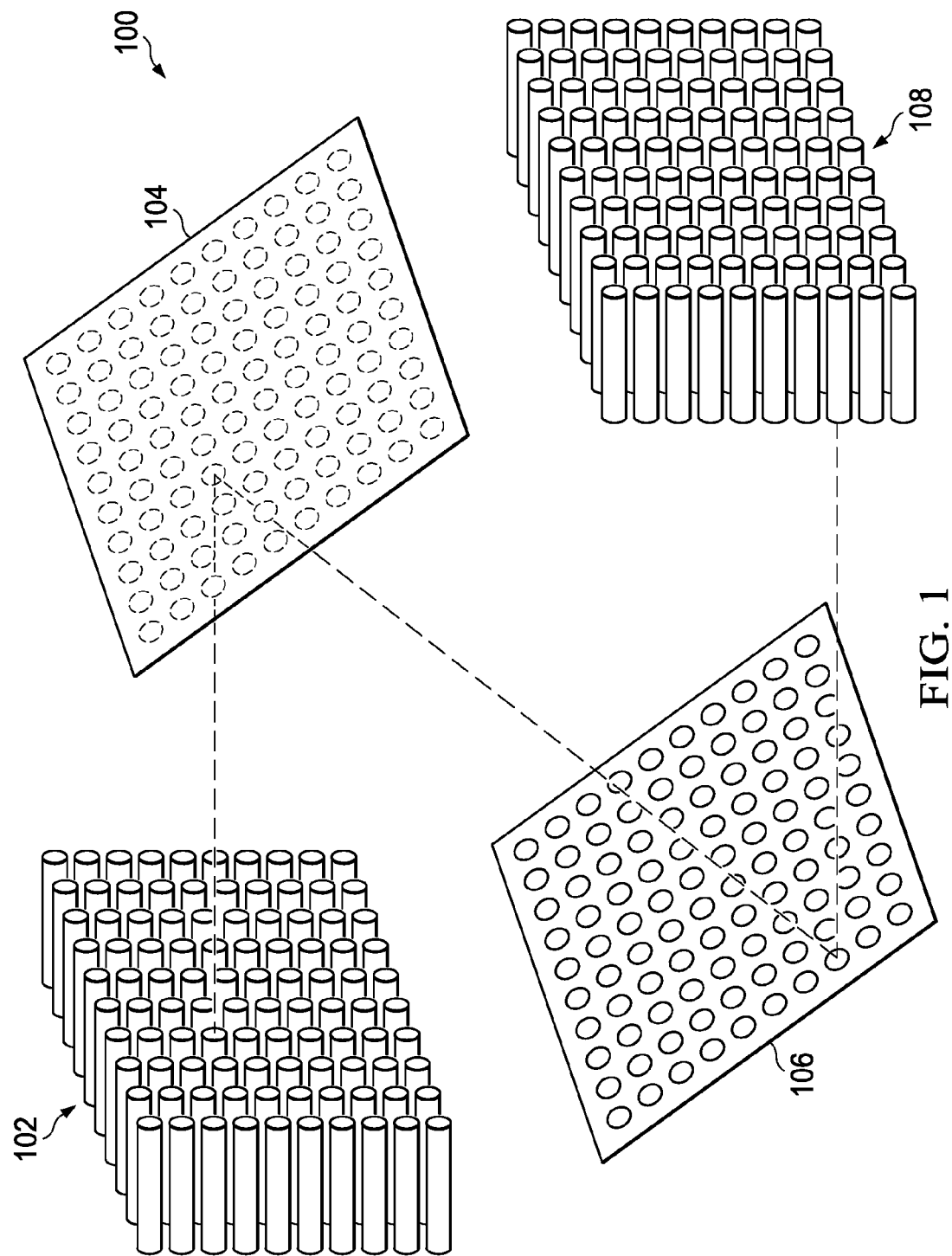
FIG. 1 illustrates an embodiment micro-electro-mechanical-system (MEMS) photonic switch.

FIG. 1 illustrates MEMS photonic switch 100, a 3D MEMS photonic switch with two arrays of steerable mirrors. MEMS photonic switch 100 contains mirror arrays 104 and 106. Light enters via collimator array 102, for example from optical fibers, and impinges on mirrors of mirror array 104. Mirrors of mirror array 104 are adjusted in angle in two planes to cause the light to impinge on the appropriate mirrors of mirror array 106. The mirrors of mirror array 106 are associated with particular output ports of collimator array 108. Also, mirrors of mirror array 106 are adjusted in angle in two planes to cause coupling of the incoming beam from the appropriate mirror on mirror array 104 to the appropriate output port. The light then exits in a collimator of collimator array 108, for example coupling to optical fibers. Similarly, light enters collimator array 108, reflects off mirrors of mirror array 106, reflects off mirrors of mirror array 104, and exits through collimator array 102.

The mirror arrays have arrays of steerable 3D-MEMS mirrors (referred to here as MEMS mirrors) which reflect a beam projected onto them by an associated collimator. The reflected beam is then reflected on an opposing mirror on the opposing mirror array. Thus, an N×N MEMS photonic switching module contains N input mirrors, each of which can access any of N mirrors on the opposing mirror array, and vice versa. This enables the mirror count to grow linearly with the port count of the switch, utilizing 2N steerable mirrors for an N×N switch. For many other methods of building photonic switches, the mirror count or crosspoint count grows as the square of the port count. Thus, MEMS photonic switches are able to scale to a large port count, while some other approaches are limited by mirror count or crosspoint count. However, as the port count grows in a MEMS photonic switch, the suitable minimum optical path length between the mirrors and/or the suitable maximum mirror deflection angle increases.

Figure 2:
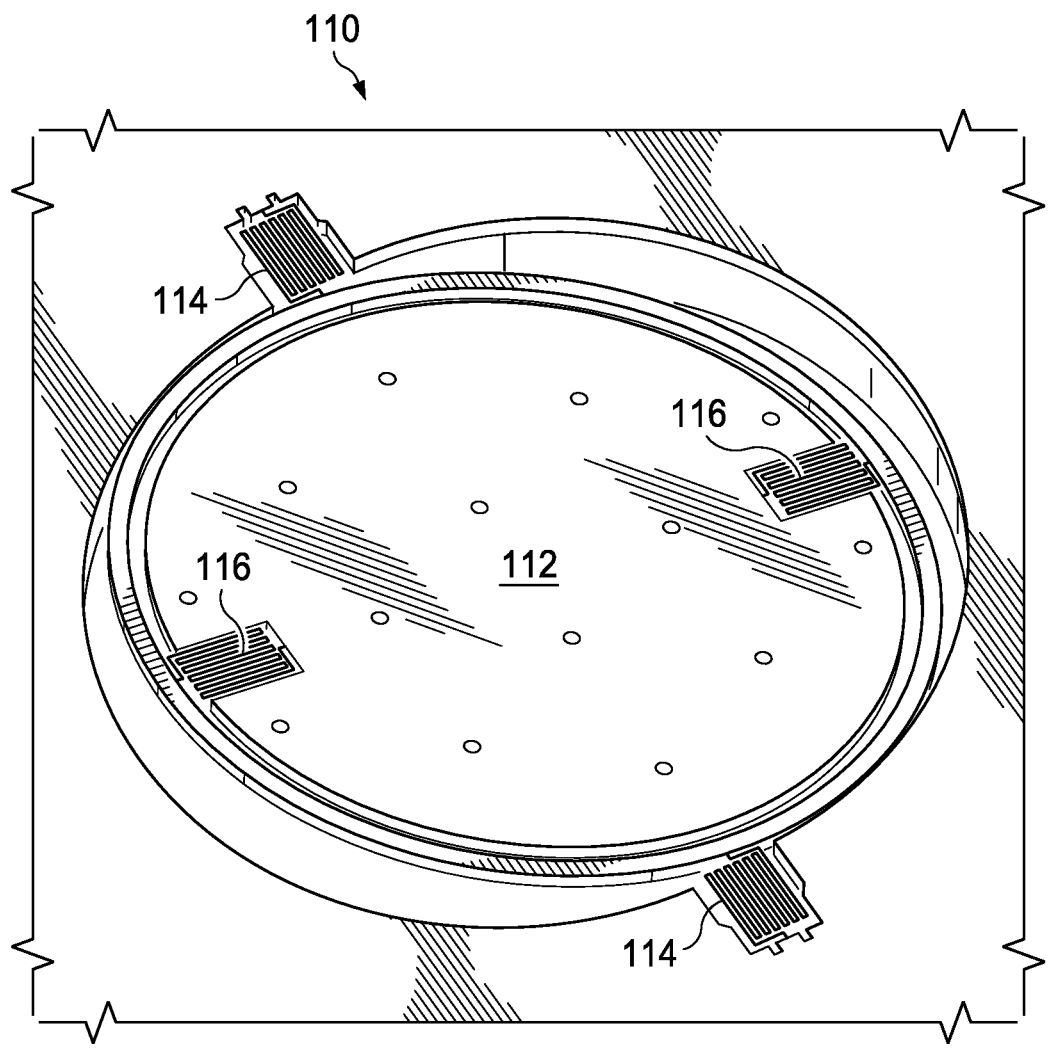
FIG. 2 illustrates an embodiment MEMS mirror structure.

The MEMS mirrors in MEMS photonic switch 100 are fabricated in a modified silicon wafer process. FIG. 2 illustrates an example MEMS mirror structure 110, which may have a diameter from about 550 µm to about 2.5 mm, for example around 1 mm. MEMS mirror structure 110 contains mirror 112 suspended on two axes of bearings 114 and 116 to allow it to tilt against the torsion spring actions of the bearings, which try to maintain mirror 112 in a particular position. Below mirror 112, at a distance of about 80 µm to 100 µm for a 1 mm mirror, are three or four segmented plate deflection electrodes. When four electrodes are used, each electrode may be associated with a mirror quadrant. When a voltage is applied to an electrode, mirror 112 is attracted towards that electrode by electrostatic attraction, and twists against the spring action of the silicon torsion springs. This deflection may be steered in both angular direction and magnitude by adjusting an applied drive voltage on one or more of the electrodes. Since the twisting force is applied as an attractive force from the mirror-electrode electric field between the activated electrode and the mirror, this force also produces a net force on the mirror pulling it towards the electrode, which is resisted by the stiffness of the torsion springs in the direction normal to the mirror. This may be achieved by making these torsion springs thick in the direction normal to the mirror surface, which increases these springs' resistance to torsional or rotational movement, resulting in higher drive voltages. These springs can be thinned, but then are prone to allowing the mirror to move vertically normal to the mirror surface. This movement may be referred to as linear movement.

Drive voltages may be up to a few hundred volts, with a maximum mirror deflection of five to seven degrees out-of-plane, for a maximum beam deviation of ten to fourteen degrees from the rest state, or a twenty to twenty eight degree peak to peak beam deviation. The mirror may be mounted from about 0.05 mm to about 0.12 mm above the electrodes. The greater the electrode-mirror gap the greater the maximum mirror angle and the higher the drive levels. In one example, sloped electrodes are used.

Figure 3:
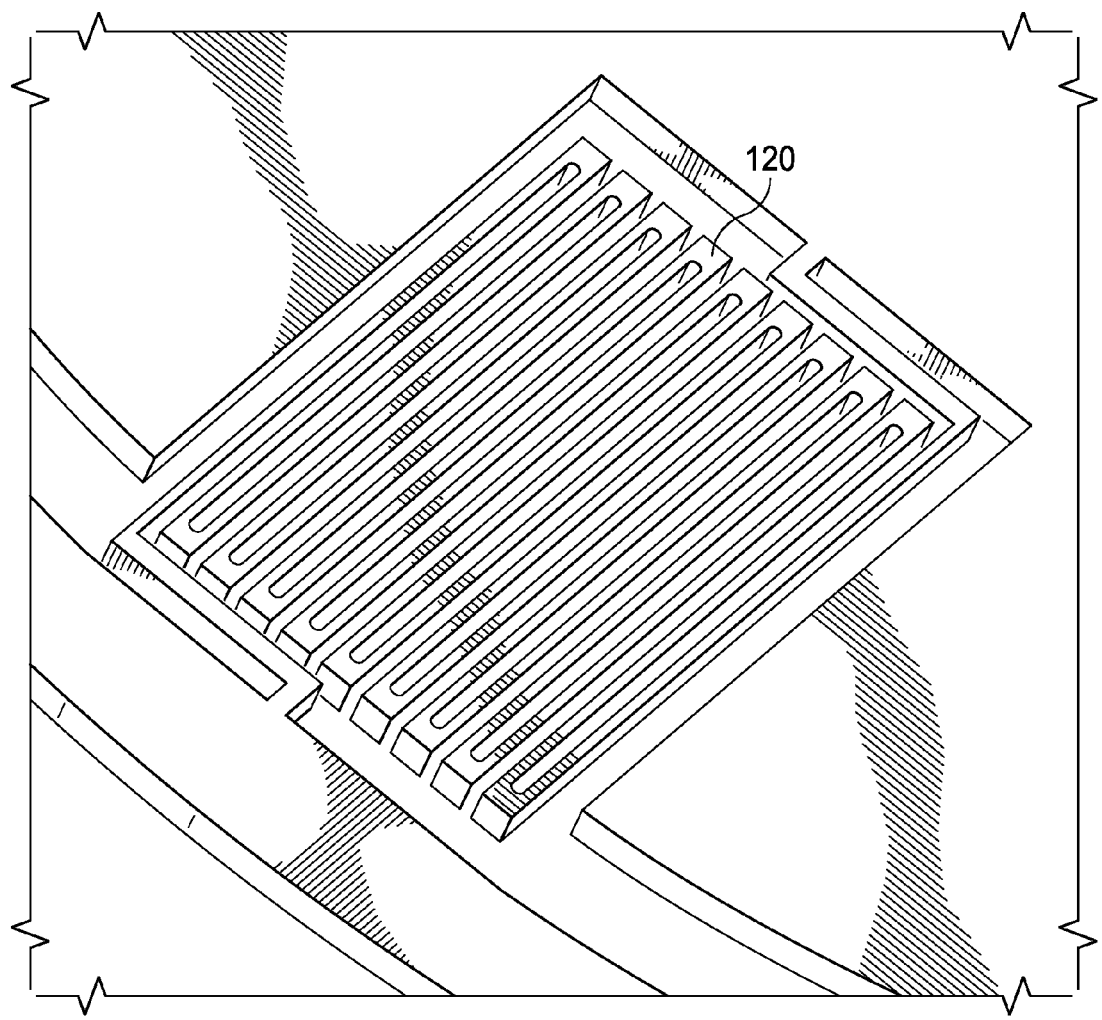
FIG. 3 illustrates an embodiment gimbal for MEMS mirrors.

FIG. 3 illustrates gimbal 120, an example of a gimbal that may be used as bearings 114 or bearings 116. Gimbal 120 may be fabricated from silicon torsion springs, which try to return the mirror to its planar position. The attractive force of the drive voltage on one or more quadrant electrodes versus the increasing spring tension forces as the mirror is moved determines the final pointing angle of the mirror.

In an example 3D-MEMS steerable mirror using a torsion spring and gimbal arrangement, an annular gimbal is free to rotate against torsion springs in one axis. A set of torsion springs attached between the annular gimbal and the mirror allow the mirror to rotate against the torsion spring tension in the other axis. This creates a sprung mass system, which can resonate torsionally. This structure may also resonate without angular motion, by the whole body of the mirror moving in and out from the rest plane—this is whole body or linear motion. The mirror may resonate linearly by moving towards and away from the electrode plate, distorting the torsion springs in a direction normal to the plane of the un-deflected mirror, especially if the torsion springs have been thinned. This vertical or linear motion may be translated into rotational motion, causing impairment of the mirror pointing angle. The linear mirror movement cyclically modulates the strength of the electric field between the mirror and the electrode plate by modulating the gap between the mirror and the plate, translating into an alternating modulation of the deflection force on the mirror, which causes a mirror rotational response to the whole mirror vibration.

Figure 4A:
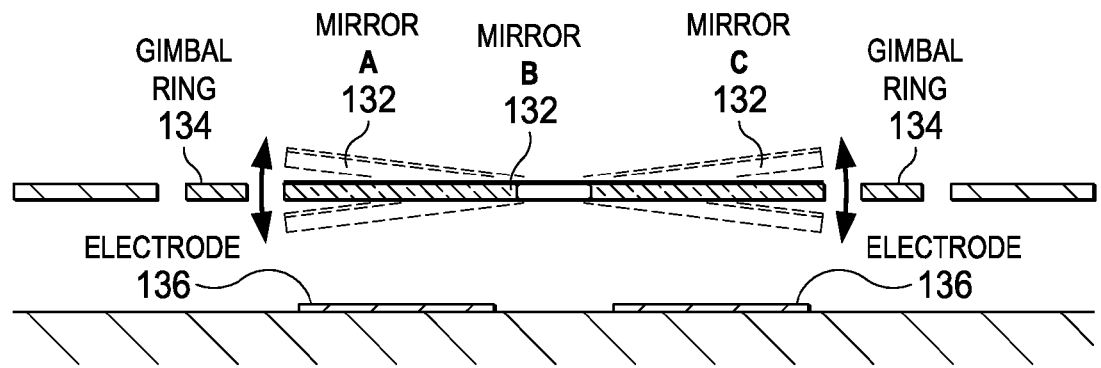
FIGS. 4A-B illustrate rotational movement of a MEMS mirror.
Figure 4B:
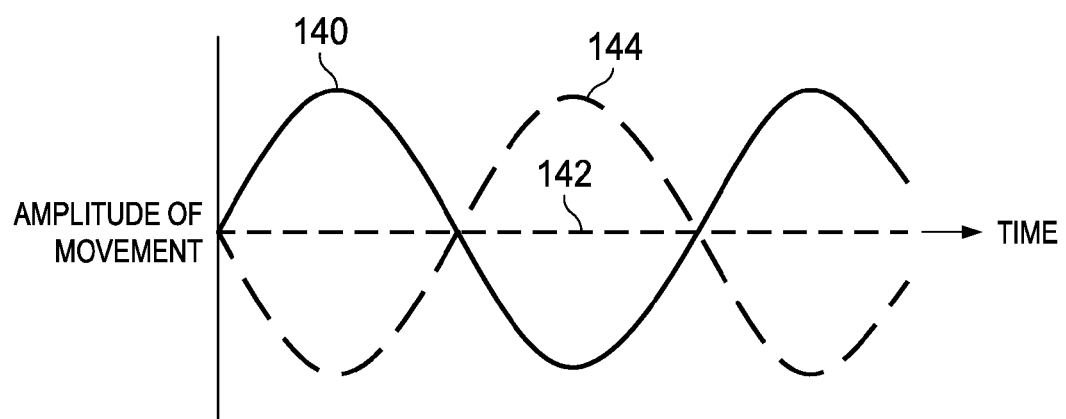

Thus, a MEMS mirror may experience rotational motion and linear motion in response to vibration. FIGS. 4A-B illustrate the rotational motion in a MEMS mirror. In FIG. 4A, mirror 132 over electrodes 136 experiences rotational motion due to torsional resonances, while gimbal ring 134 remains stationary. FIG. 4B illustrates the motion of one edge of the mirror in curve 140, of the opposite edge of the mirror in curve 144, and at the center of the mirror in curve 142. The center of the mirror remains stationary while the edges oscillate.

Figure 5A:
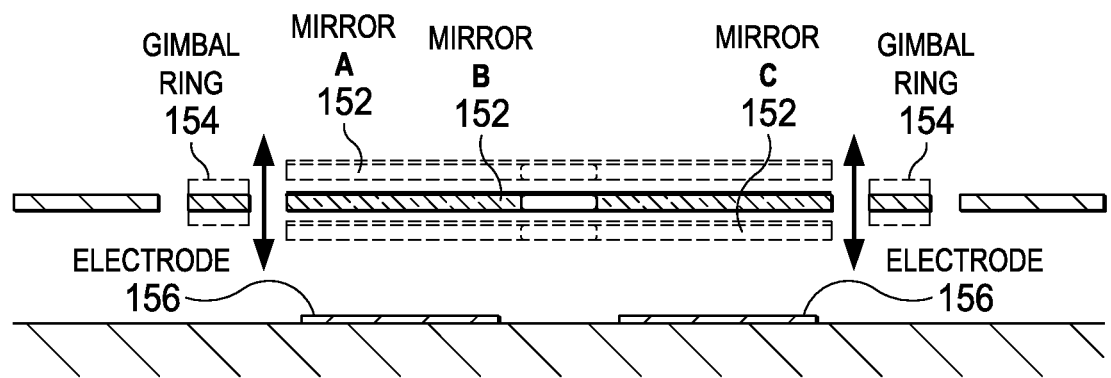
FIGS. 5A-B illustrate linear movement of a MEMS mirror.
Figure 5B:
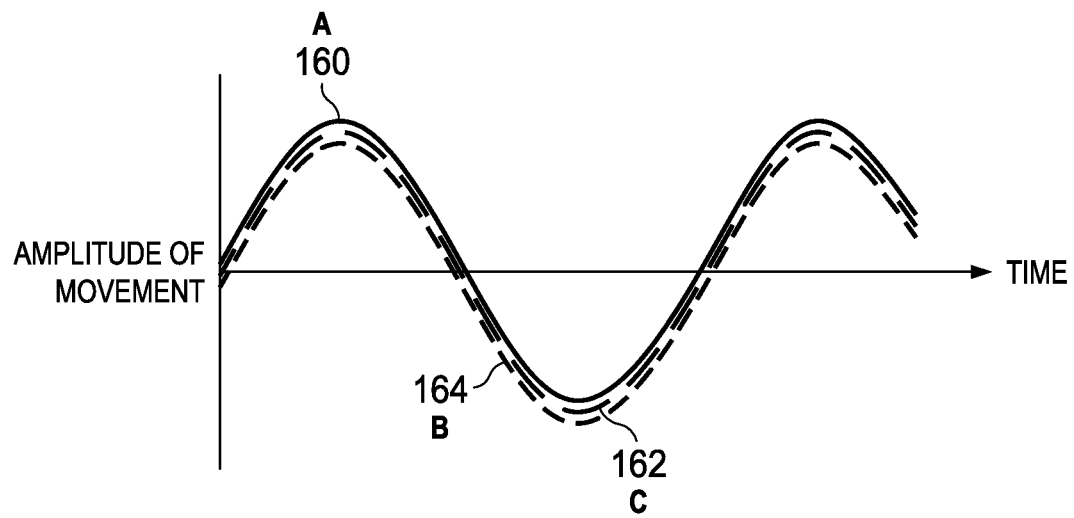

The linear motion of a MEMS mirror is demonstrated by FIGS. 5A-B. Mirror 152 over electrodes 156 moves linearly up and down. Also, gimbal ring 154 moves linearly up and down. FIG. 5B shows a graph of one edge of the mirror in curve 160, the opposite edge of the mirror in curve 162, and the center of the mirror in curve 164. The motion of the mirror is uniform.

In the absence of a rotational movement, linear movement has little effect on the optical path, because, even if the beam is impinging on the mirror at an angle somewhat removed from normal to the mirror, the amount of mirror movement is small relative to the beam diameter. Hence, the beam hardly moves on the mirror, and the mirror pointing angle does not change. However, linear movement may be converted to rotational movement. If there is a small difference in the spring constants or a slight imbalance in the mass, so the center of gravity of the sprung mass is not exactly at the center of the four springs, the springs apply different restorative forces to the mirror, generating conversion of the linear energy to rotational energy. Additionally, the electrode gap is modulated when the mirror moves linearly in the direction of the electrode, causing a modulation in the electric field, resulting in alternating non-linear increases and decreases of the electric field as the mirror moves in the linear direction. This nonlinear alternation induces a rotational movement, which affects the beam pointing angle.

Figure 6:
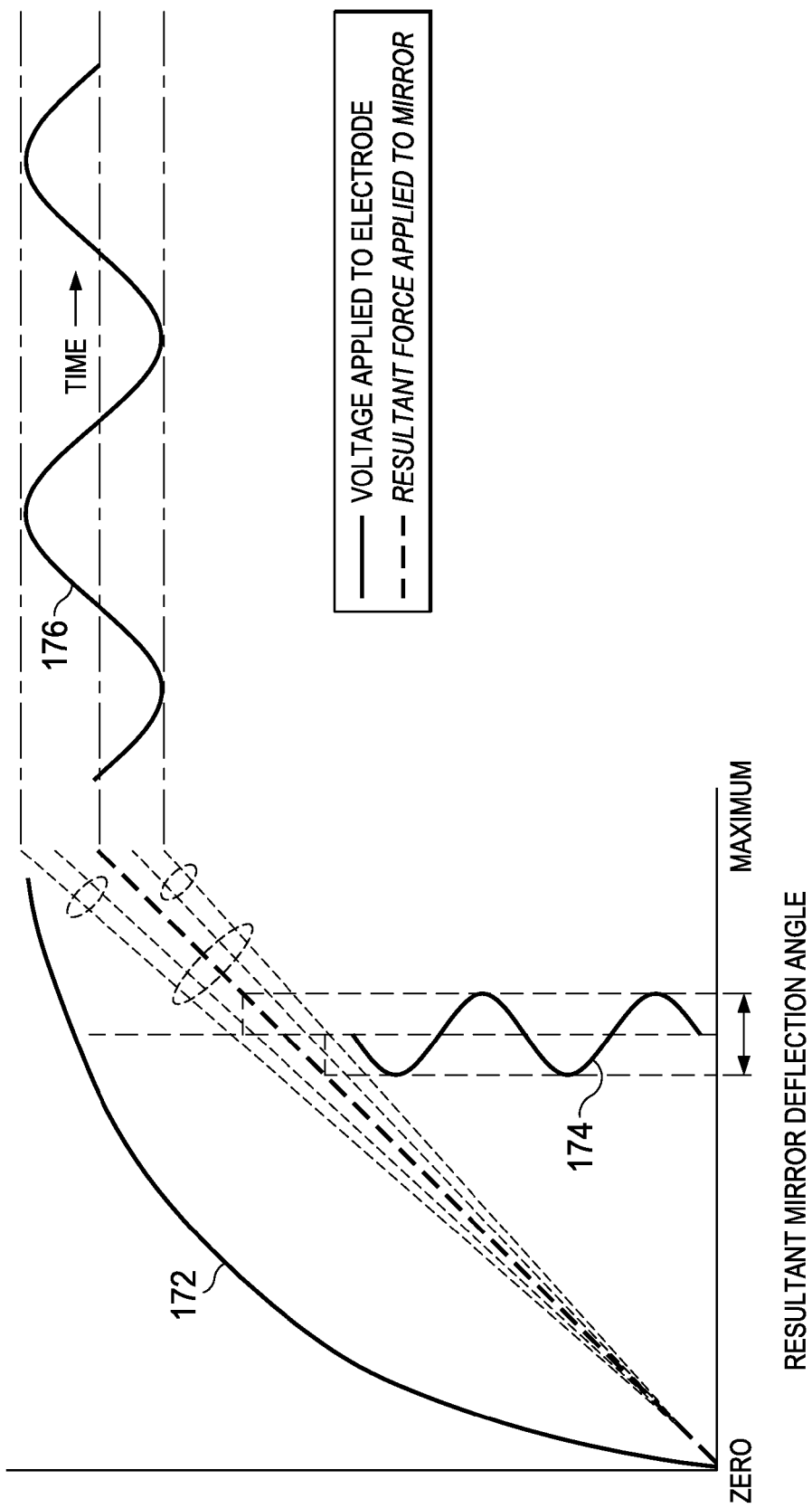
FIG. 6 illustrates the conversion of linear motion to rotational motion in a MEMS mirror when a voltage is applied to an electrode.

The amount of translation of linear energy into rotational energy depends on the electric field and electric field gap, and hence on the deflection angle induced by that electric field. The effects are more severe at high deflection angles. FIG. 6 illustrates the conversion of the modulation of the electrode gap to a rotational movement. Curve 172 shows the relationship of the voltage applied to the electrode and the static deflection angle achieved. Curve 176 shows an example modulation of the mirror-electrode gap due to linear or whole body motion as the whole mirror moves towards and away from the electrodes—for instance as a result of a resonance triggered by a mechanical shock or vibration event. This changes the nominal force-angular deflection characteristics to create alternating new characteristics. Moving cyclically between these dashed lines creates alternating force modulation on the mirror resulting in rotational movement which results from the force on the mirror from a modulated electric field. For a given voltage drive, the linear movement modulates the mirror-electrode gap, and hence modulates the electric field and the force on the mirror. When the mirror-electrode gap is reduced, the electric field increases, and when the mirror-electrode gap is increased, the electric field reduces. Curve 174 shows the peak to peak rotational conversion component. This effect may be reduced by making the torsion spring thick in the direction normal to the electrode surface, which makes the torsion spring resist being deflected out of plane. However, this also makes the torsion spring very stiff in the rotational or torsional mode, which increases the drive voltages, limiting the overdrive that can be used in active dynamic mirror control systems. Thinning the spring improves the torsional flexibility but increases the mirrors' susceptibility to being vertically or linearly deflected.

A trigger for linear movement of the MEMS mirror comes from the nature of the drive signal. The drive signal is applied asymmetrically to the control electrodes to induce mirror angular displacement by attracting the area of the mirror over the appropriate electrode towards that electrode. While the drive voltage and the resultant electrostatic force produces a twisting movement, it also produces a net downward force on the mirror, because the opposing force is applied to push the other side of the mirror away from its electrode. This has the effect of pulling the overall center of the mirror down below the original axis point, triggering a linear resonance and dissipating some of the drive force into linear motion instead of rotational motion.

Figure 7:
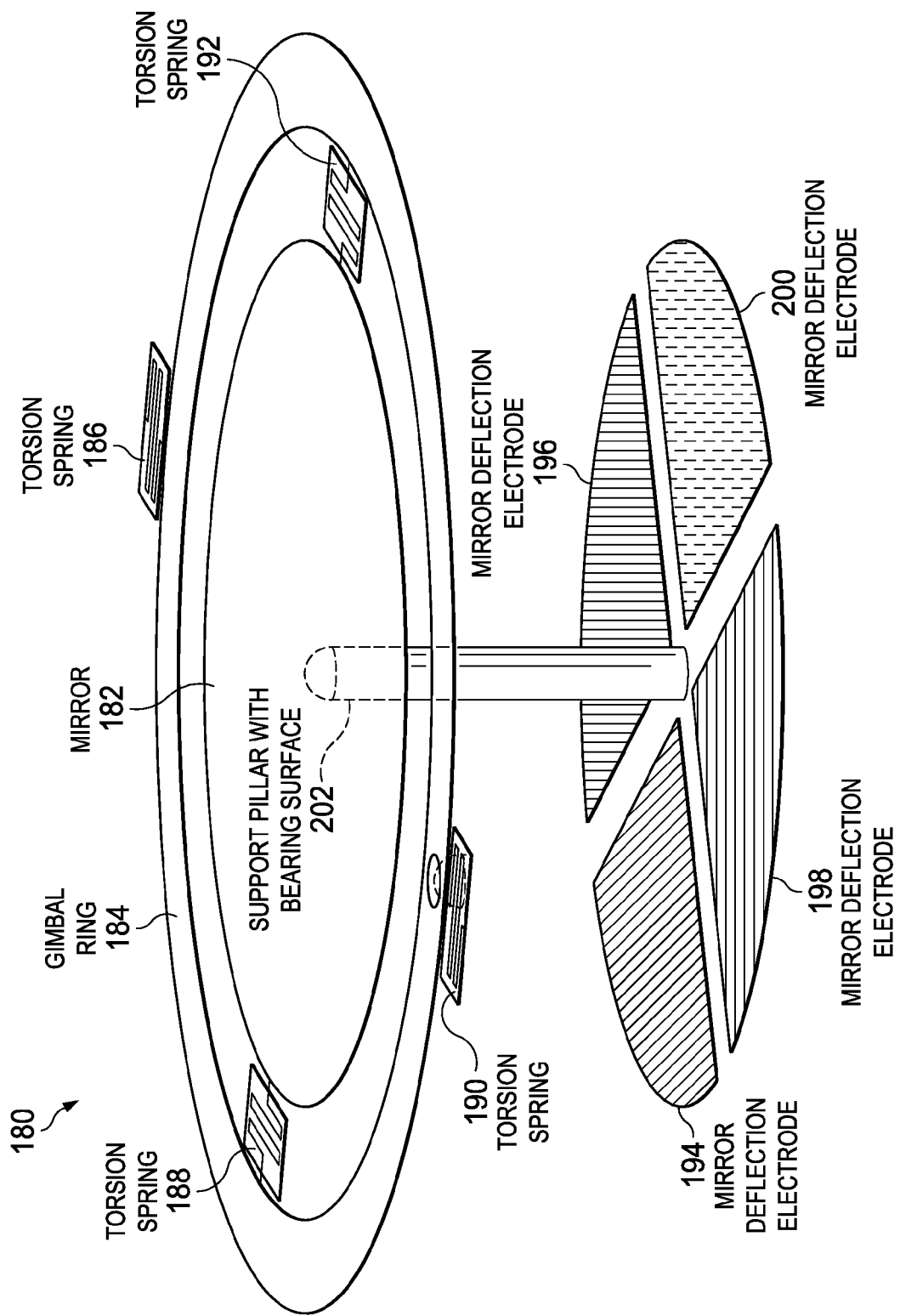
FIG. 7 illustrates an embodiment MEMS mirror structure with a support pillar under the mirror.

FIG. 7 illustrates MEMS mirror structure 180 with a pillar having a bearing surface under the mirror to prevent the mirror from moving closer to the electrodes. The vertical scale has been exaggerated for clarity. Torsion springs 188 and 192 connect mirror 182 to gimbal ring 184, while torsion springs 186 and 190 connect gimbal ring 184 to a support (not pictured). Support pillar 202 is between mirror 182 and an electrode plate containing electrodes 194, 196, 198, and 200. For a 1 mm mirror, the mirror-electrode spacing may be about 0.05 mm to about 0.1 mm. Deflection of the mirror center below the datum point is prevented, preventing a linear resonance, because the deflection force from the electrode drive pulls the mirror center of mass towards the electrode plane. The pillar prevents linear downward movement while permitting rotational movement in any direction. As a result, the electric field energy is applied to rotating the mirror, rather than providing the total mirror with a velocity towards the electrodes. As a result, the torsion springs may be thinned, since they do not have to resist the whole mirror being pulled towards the electrodes.

Figure 8:
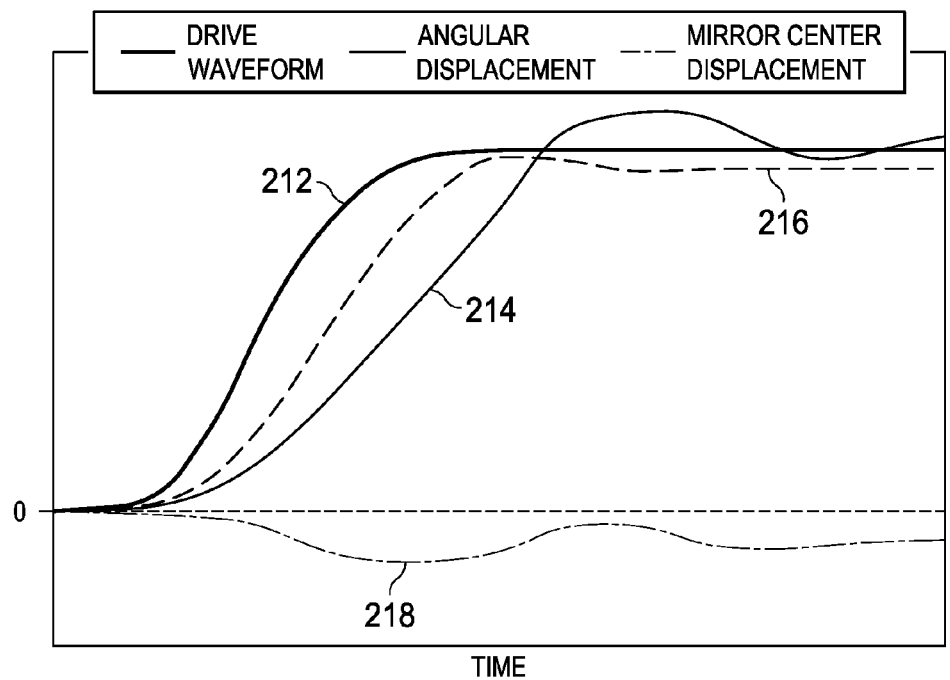
FIG. 8 illustrates a graph of MEMS mirror rotational and linear motion in response to an applied voltage.
Figure 9:
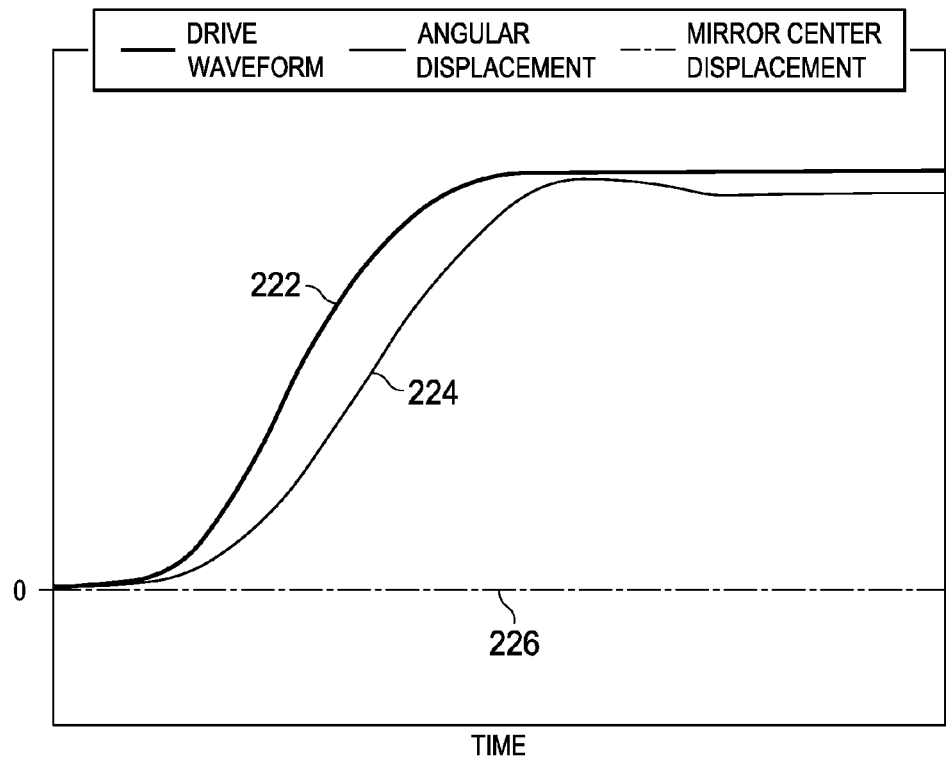
FIG. 9 illustrates a graph of MEMS mirror rotational and linear motion in response to an applied voltage when linear motion is prevented.

Examples of mirror linear and rotational motion under a moderately sharp edged drive voltage are illustrated by FIGS. 8 and 9. FIG. 8 illustrates the mirror trajectory when linear movement is not prevented. Curve 216 shows the intended mirror trajectory, while curve 212 shows the applied voltage, and curve 214 shows the actual angular mirror trajectory. The division of energy between the rotational mode and the linear mode produces a slower rise time for the actual trajectory. Curve 218 shows the linear motion of the mirror. The mirror moves towards the electrode plate, and the mirror settling closer to the electrodes after some resonance.

FIG. 9 illustrates a graph of the angular displacement of the mirror when the mirror is prevented from moving linearly. Curve 222 shows the applied voltage, and curve 224 shows both the desired and actual trajectory. Curve 226 shows the non-existent linear movement of the mirror. The energy goes into rotational motion.

When the drive voltage is suddenly removed, for example to return the mirror to a lower angle of deflection, the downward force from the electrostatic field is reduced, but not removed. If necessary, the new deflection can be set by reducing the drive somewhat on one electrode and increasing it on the opposing electrode to maintain a downward force to hold the mirror against the pivot point, thereby preventing the mirror from bouncing off the pillar. Applying this force enables the mirror to avoid lifting off of the pivot point during moderate external vibration events.

Impulse drives may be used to achieve fast switching in 3D-MEMS switching fabrics. Linear resonances may slow the set up time and leave the system dealing with the effects of an ongoing triggered linear resonance.

Figure 10:
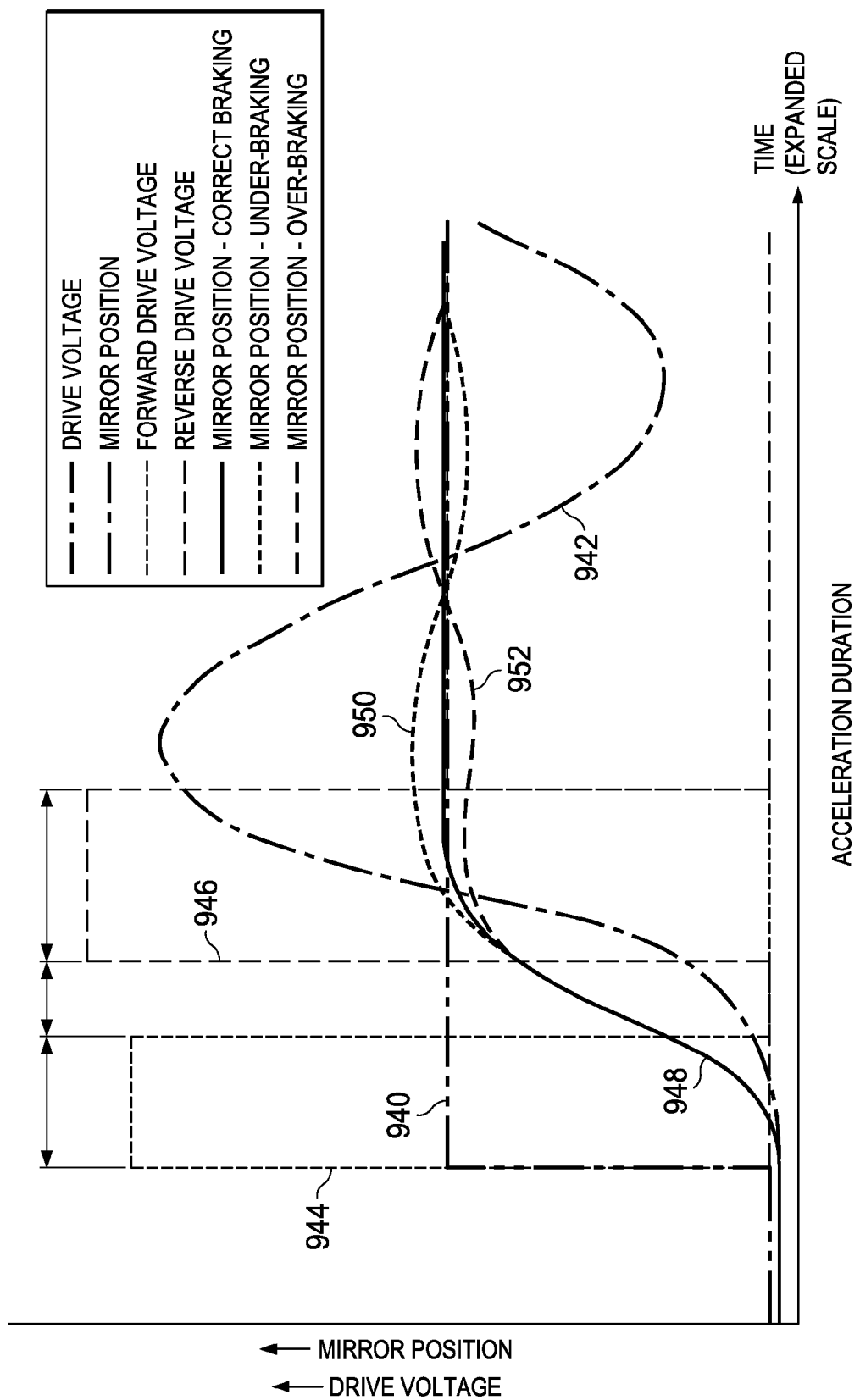
FIG. 10 illustrates MEMS mirror motion when acceleration and deceleration impulses are applied and linear movement is not prevented.

FIG. 10 illustrates the application of an acceleration voltage and a braking voltage to electrodes. When waveform 940, a step voltage, is applied, the mirror moves along curve 942, allowing the development of an oscillation. This is because the potential energy and kinetic energy of the mirror are not managed to bring both excess potential energy and total kinetic energy to zero at the required angle of rest, so a resonance develops between the excess potential energy and the residual kinetic energy, until the system losses absorb this energy. Waveform 944 is an acceleration voltage impulse, and waveform 946 is a braking impulse applied to the electrode and calculated to nominally manage the mirror kinetic energy and excess potential energy to render the mirror stationary at the required deflection angle. Curve 948 shows the response with the desired braking, curve 950 shows the response for under-braking, and curve 952 shows the response for over-braking, for instance due to tolerances in the drive waveforms or their derivation. During the time between the application of the acceleration voltage and the braking voltage, the mirror coasts towards its final position, retarded by the spring pressure. The fastest switching occurs when the coasting period is eliminated, and the acceleration and deceleration times are expanded. While the braking voltage is applied, there is a period of deceleration. The deceleration voltage may be applied for a longer time than the acceleration voltage, because the larger electrode-mirror gap reduces the deceleration. A drive voltage for the correct mirror angle is applied as soon as braking is completed. The mirror reaches its final position with zero velocity, and therefore with zero kinetic energy, which suppresses the mechanical resonances.

Figure 11:
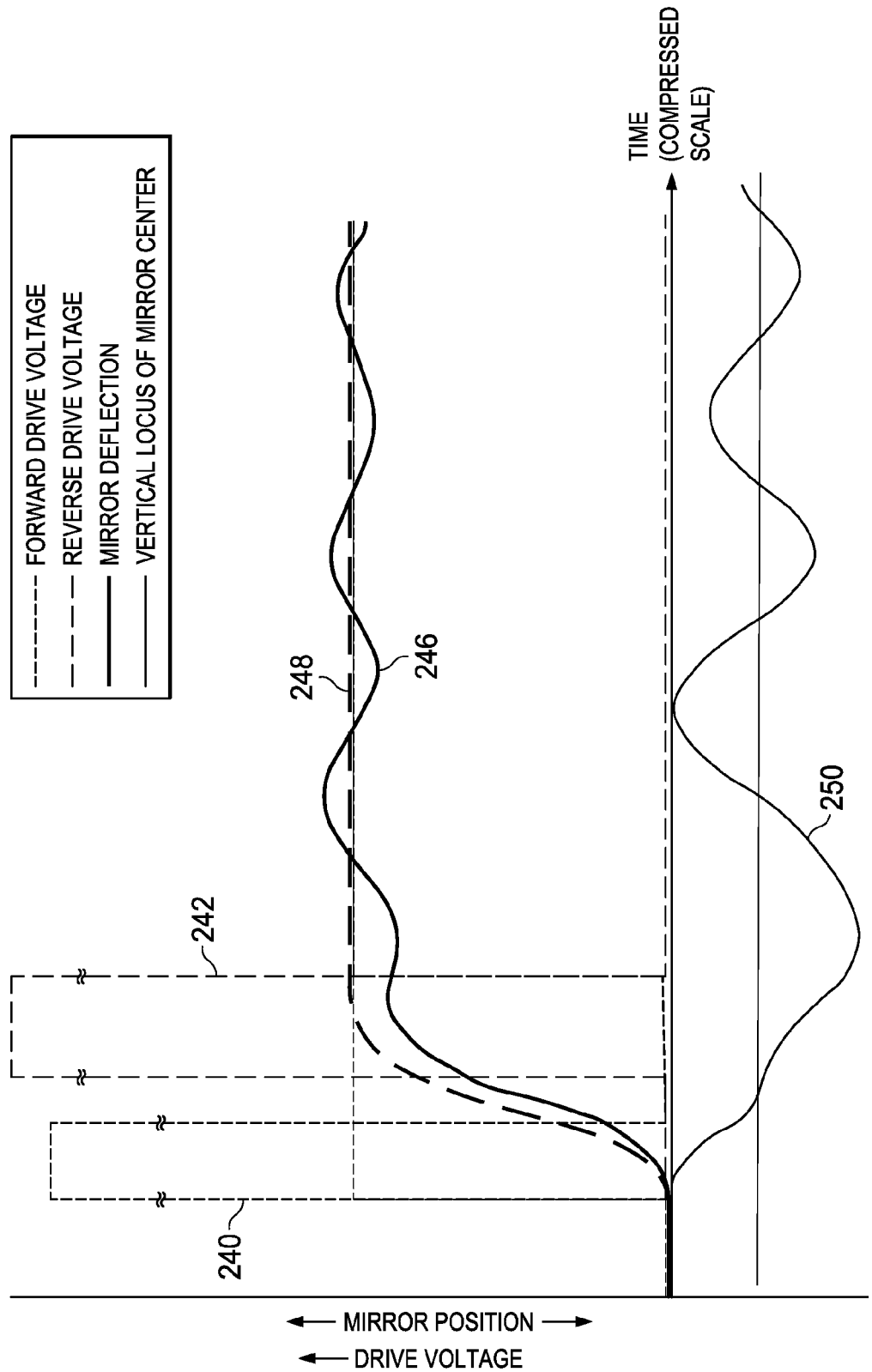
FIG. 11 illustrates MEMS mirror motion when acceleration and deceleration impulses are applied and linear motion is not prevented.

FIG. 11 illustrates some of the rotation motion of a MEMS mirror being converted to linear motion. An acceleration pulse is applied with curve 240, a deceleration pulse is applied with curve 242, and a maintenance voltage is applied. Curve 248 shows the desired angular mirror path, curve 246 shows the actual angular mirror path, and curve 250 shows the linear motion of the mirror.

During the acceleration impulse, the mirror accelerates rotationally from the moment arm of the force and continues to accelerate towards the electrode plate. Once the impulse has finished, the mirror rotationally coasts, slowed by the torsion of the springs as the lateral restorative pressure of the torsion springs is applied. Also, the rotation rate is reduced because of the conversion of some of the rotational motion and energy into linear motion and energy. This may result in a lower rate of rotation of the mirror. Once the braking impulse is applied the mirror's rotational velocity is reduced, both from the torsion spring pressure and the braking impulse. The linear movement of the mirror may accelerate, until it reaches the point where the lateral deflection of the torsion springs is balancing the acceleration force. When the braking impulse is removed and the maintenance voltage is applied, the mirror is nominally stationary rotationally. However, the mirror-spring system stores linear energy from the acceleration impulse and the braking impulse, both of which act in the same sense on the mirror. The linear displacement may be reduced following the application of the maintenance voltage, in which case the mirror is in a linear resonance mode, which modulates the mirror electrode gap, causing the electric field to be modulated, resulting in a translation of this linear motion into a rotational motion of the mirror due to modulating the mirror-electrode gap. This may be of a large amplitude, depending on the nature and level of the linear resonance triggered, which depends on the size and duration of the acceleration and deceleration impulses, the deflection angle, and several other factors, such as the resistance of the torsion springs to linear mirror displacement and the damping level of the resonances arising from this movement.

Figure 12:
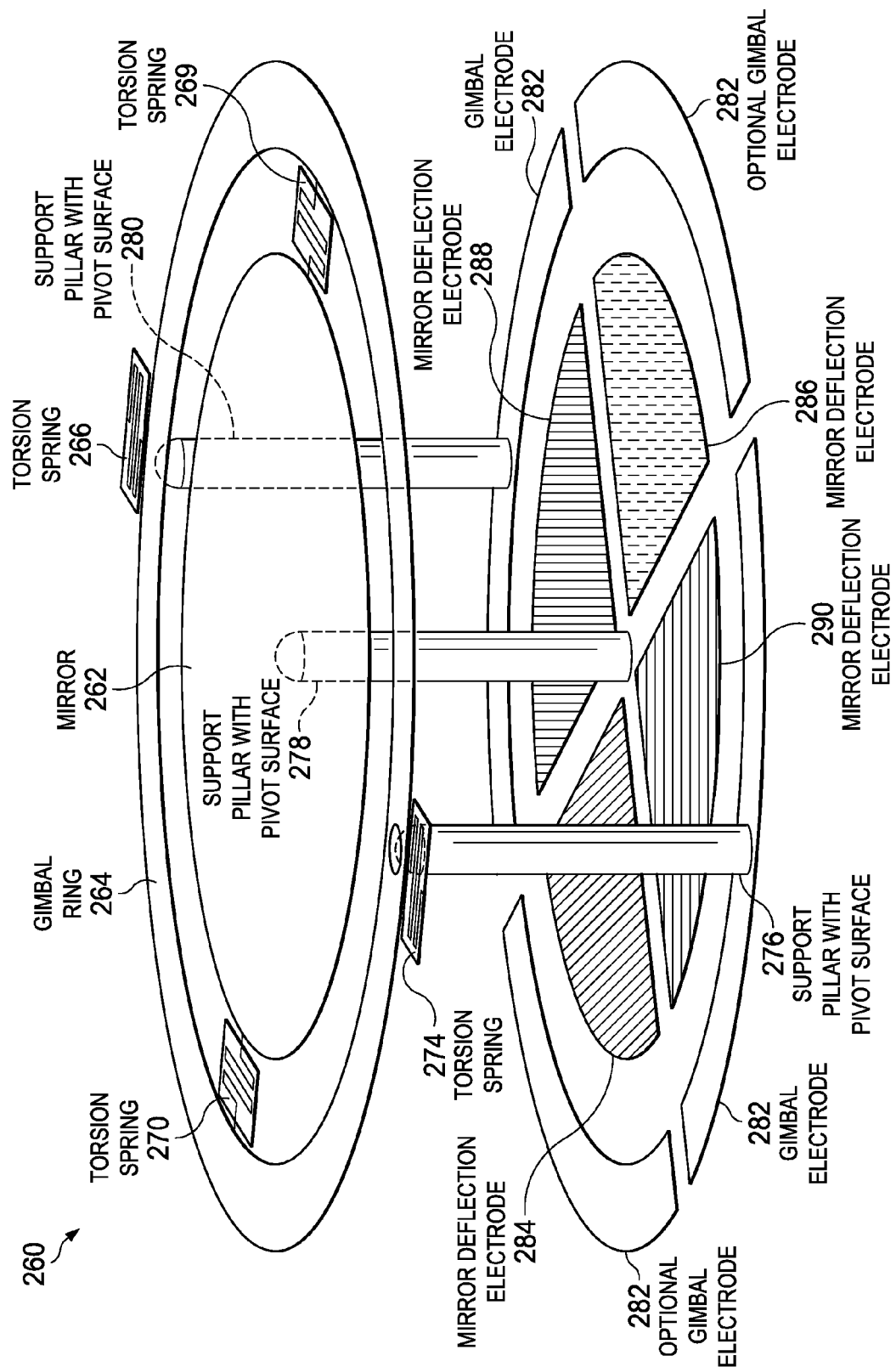
FIG. 12 illustrates an embodiment MEMS mirror module with support pillars under the mirror and the gimbal ring.

FIG. 12 illustrates mirror structure 260 with the stabilization of the gimbal ring and the mirror using support pillars. In addition to pillar 278 supporting mirror 262, pillars 276 and 280 support gimbal ring 264. Pillars 276 and 280 prevent gimbal ring 264 from moving closer to the electrodes. Pillars 276 and 280 enable gimbal ring 264 to tilt in one axis while providing support against the gimbal ring's torsion springs being deflected towards the electrode plate. Torsion springs 269 and 270 connect mirror 262 and gimbal ring 264, while torsion springs 266 and 274 connect gimbal ring 264 to a support. In one embodiment, the pillars and their rounded tops are slightly higher than the spacing between the mirror/gimbal plate and the electrode plate. The gimbal ring and mirror are slightly displaced upwards, away from the electrode plate, resulting in the torsion springs being slightly distorted out of the plane. The torsion springs then apply a downward force towards the electrode plate, keeping the gimbal ring in contact with its pillar.

In another embodiment, the mirror plate and electrode plate have an inter-plate spacer closely matched to the height of the gimbal and mirror pivot pillars such that the gimbal-pillar and mirror-pillar residual gaps are either small or non-existent with minimal displacement of the gimbals and mirrors. Then, by applying a voltage to electrodes 284, 286, 288, and 290 under mirror 262 and electrode 282 under gimbal ring 264, mirror 262 and gimbal ring 264 are attracted downward towards the electrode plate, holding them against the tops of the pillars.

The gimbal ring electrode may be an annulus or segments of an annulus. If the gimbal electrode is an annulus or segments of an annulus symmetrical about the pivot point, it produces only a vertical force through the center of the gimbal ring with no rotational force moment to deflect the gimbal rotationally. Using a short segment of an annulus close to and symmetrically placed on either side of the electrode may be used because the electric field of the electrode, and hence the force it applies to the gimbal ring is less affected by the movement of the gimbal ring from mirror deflection forces.

Because the mirror rests on one spherical pivot surface, it is free to rotate in any direction. The mirror is prevented from moving linearly towards the electrode plate by the pivot point. The mirror can be forced to remain in contact with the pivot surface by a mechanical method, an electrical method, or both. In the electrical method, a small force towards the electrode plate is applied at all times to hold the mirror against the pivot surface. For high angles of deflection, this is achieved by the voltage applied to the electrode to achieve the angle. However, for small angles of deflection, an additional drive level may be added to the mirror electrodes.

Figure 13:
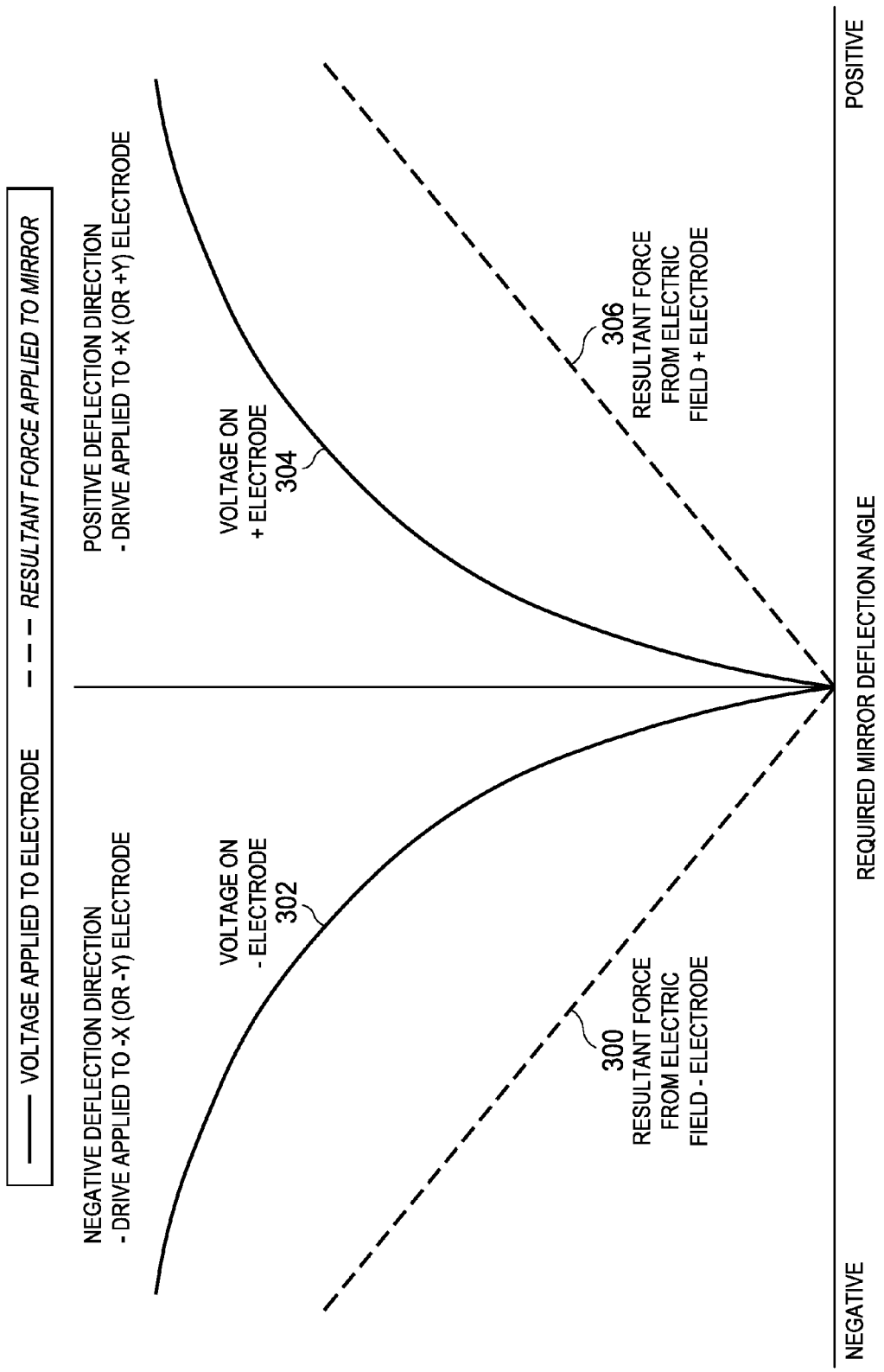
FIG. 13 illustrates a graph of drive voltages and electric fields applied to a MEMS mirror.

FIG. 13 illustrates an example of applied voltages where the voltage goes to zero at a zero degree deflection angle. Curve 302 shows the voltage applied to the negative electrode as a function of deflection angle, and curve 304 shows the voltage applied to the positive electrode as a function of deflection angle. The negative electrode induces negative angles on the mirror deflection, while the positive electrode induces positive angles on the mirror deflection. Curve 300 shows the force on the mirror from the electric field from the negative electrode, while curve 306 shows the force on the mirror from the electric field from the positive electrode. At a deflection angle of zero degrees, the voltages and forces are zero. The deflection force is linear with rising deflection angle. The mirror deflection becomes increasingly sensitive to drive voltage as deflection increases, because the mirror-electrode gap is decreased, increasing the electric field, and hence the force, for a given voltage level. The mirror is rotated by the center of force from the energized electrode being offset from the mirror center and the pivot point, thereby creating a moment arm. The resultant torque of the downward force from the electrode multiplied by the moment arm twists the mirror against the torsion spring tension. The total downward force on the mirror is proportional to the absolute value of the angle of deflection. As a consequence, the downward force drops at very low deflection levels, and reaches zero at no deflection.

Figure 14:
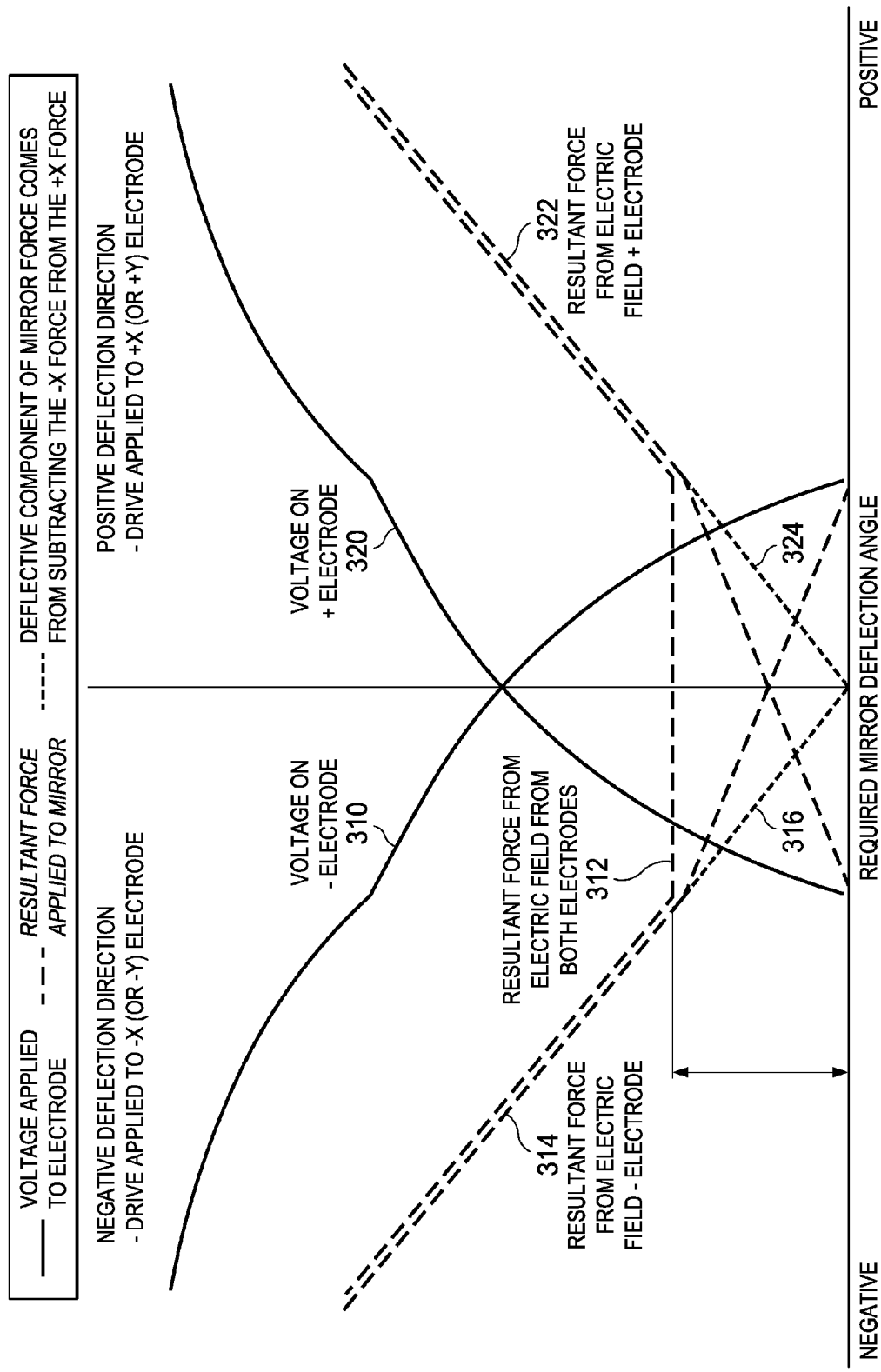
FIG. 14 illustrates another graph of drive voltages and electric fields applied to a MEMS mirrors.

FIG. 14 illustrates the applied voltages where a voltage is applied to one of the electrodes to maintain a minimum downward force for all deflection angles. Curve 310 shows the applied voltage as a function of deflection angle on the negative electrode, while curve 320 shows the applied voltage as a function of deflection angle on the positive electrode. The force from the electric field from the negative electrode is given by curve 314, the force from the electric field from the positive electrode is given by curve 322, and the force from the electric fields from both electrodes is given by curve 312. Curve 316 shows the positive deflection component of the force on the mirror, and curve 324 shows the negative deflection component of the force on the mirror. A minimum force of curve 312 is maintained for all deflection angles. This value is controlled by the amount of overlap in the drive signals. The mirror angular deflection is achieved by the difference in voltage between the positive and negative electrodes while the mirror-bearing retention force comes from the common mode drive voltages.

In another embodiment, both electrodes are driven with a common mode voltage component as well as a differential component over the entire deflection range.

The use of overlapping drive signals somewhat linearizes the drive, because the mirrors are driven in a push-pull mode in the low deflection area, where the increase in drive voltage on one plate is matched by a reduction in drive voltage on the opposing plate. The overlap region is determined by the minimum downward force to be maintained on the mirror to remain in contact with the pivot point, including under moderate vibration.

Figure 15:
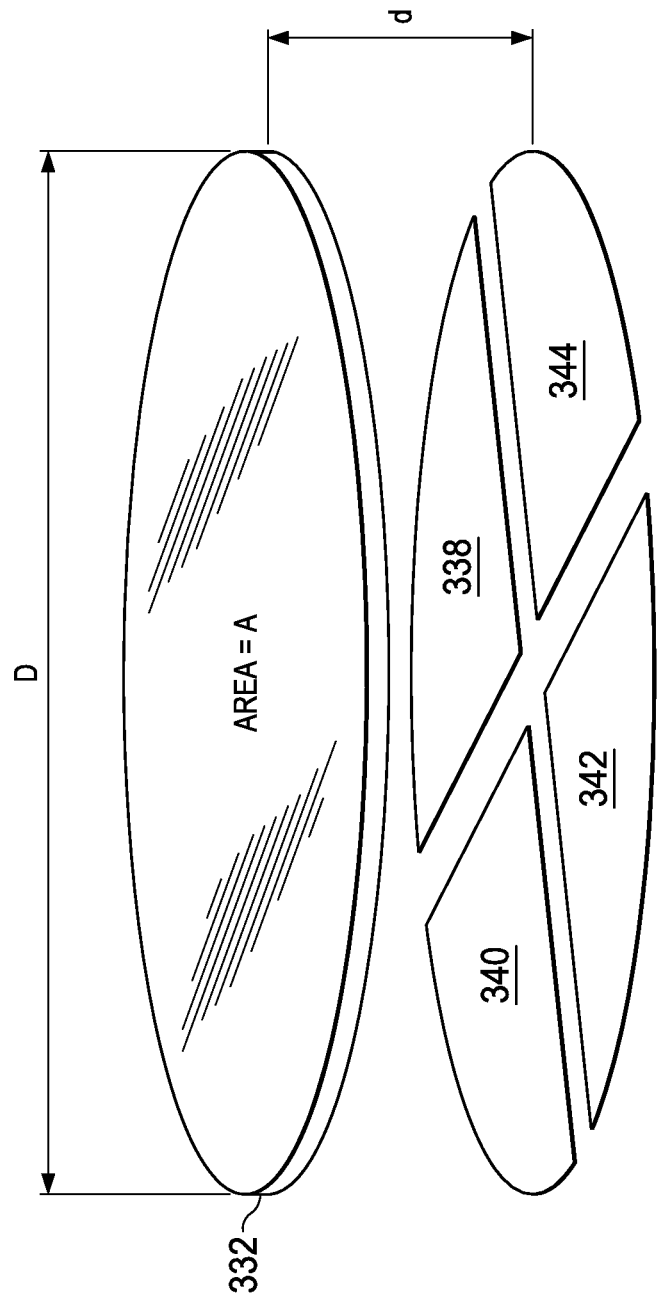
FIG. 15 illustrates a model of a MEMS mirror structure.

FIG. 15 illustrates a model of a MEMS mirror system. Mirror 332 has a diameter D and area A. At a distance d below mirror 332 are electrodes 338, 340, 342, and 344 on an electrode plate. Distance d may be from about 0.05 mm to about 0.09 mm, while the thickness of mirror 332 may be from about 0.01 mm to about 0.04 mm. Diameter D is about 1 mm, as is the diameter of the electrode plate. The four electrodes are driven with a common mode voltage component. The force on the mirror is given by:

$$\frac{(\varepsilon_o A V^2)\left(1+\left(\frac{2d}{D}\right)\right)}{2d^2},$$

and the acceleration is given by the force divided by the mirror mass. A 1 mm diameter, 20 micrometer thick disk of Silicon, with a thin flashing of gold on one surface may have a mass of around 37 micrograms.

Figure 16:
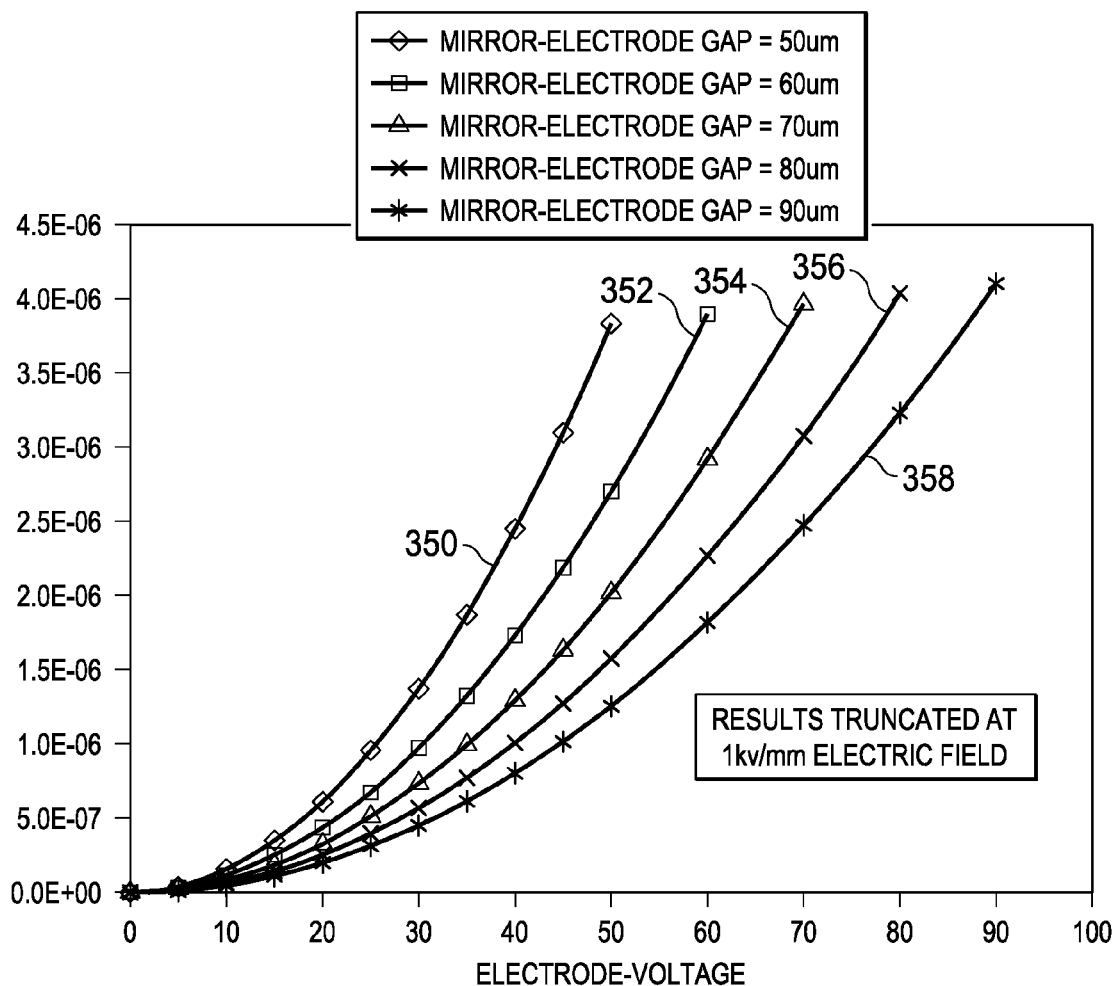
FIG. 16 illustrates a graph of the downward force on the mirror versus electrode voltage.

The resulting force from the electrode voltage in the model is given by the graph in FIG. 16 for a 1 mm mirror diameter. Curve 350 shows the results for a 50 µm mirror-electrode gap, curve 352 shows the force for a 60 µm mirror-electrode gap, curve 354 shows the force for a 70 µm mirror-electrode gap, curve 356 shows the force for an 80 µm mirror-electrode gap, and curve 358 shows the force for a 90 µm mirror-electrode gap.

Figure 17:
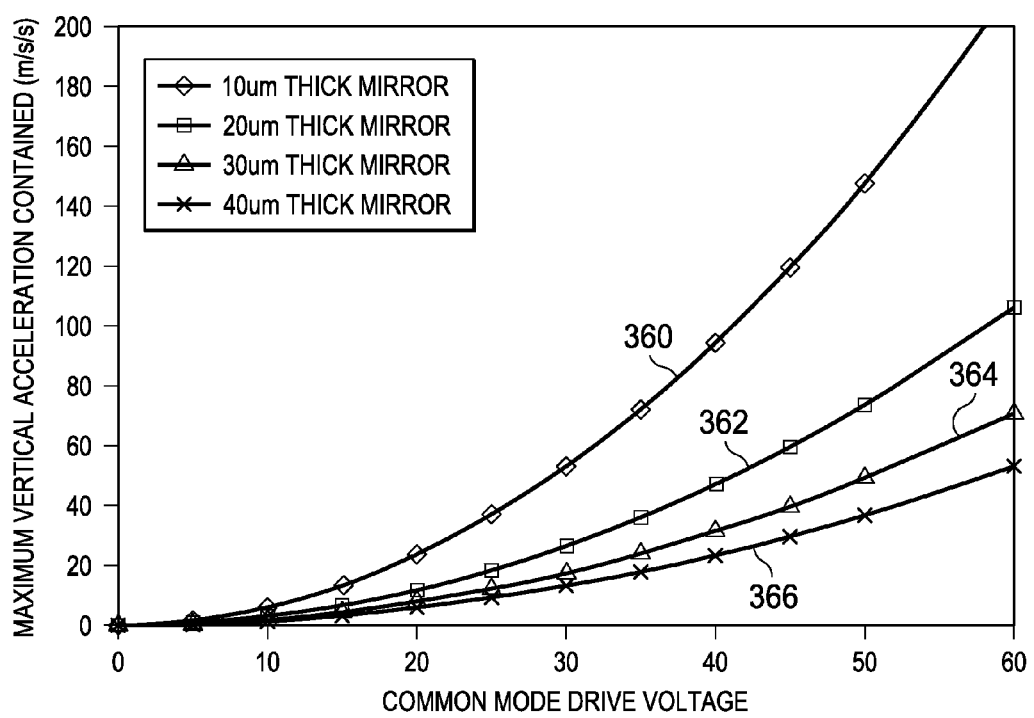
FIG. 17 illustrates a graph of the maximum acceleration for a MEMS mirror versus common mode drive voltage.

FIG. 17 illustrates the maximum vertical acceleration versus common mode drive voltage for this modeled system. Curve 360 shows the acceleration for a 10 µm thick mirror, curve 362 shows the acceleration for a 20 µm thick mirror, curve 364 shows the acceleration for a 30 µm mirror, and curve 366 shows the acceleration for a 40 µm mirror. For a common mode voltage of 30 V, a 10 µm thick mirror remains in contact with the bearing up to a lift-off acceleration of about 56 m/s$^2$, which is about 5.6 g. For a common mode drive level of 45 V, a mirror up to 40 µm thick resists a lift-off acceleration of 30 m/s$^2$, or about 3 g.

Figure 18:
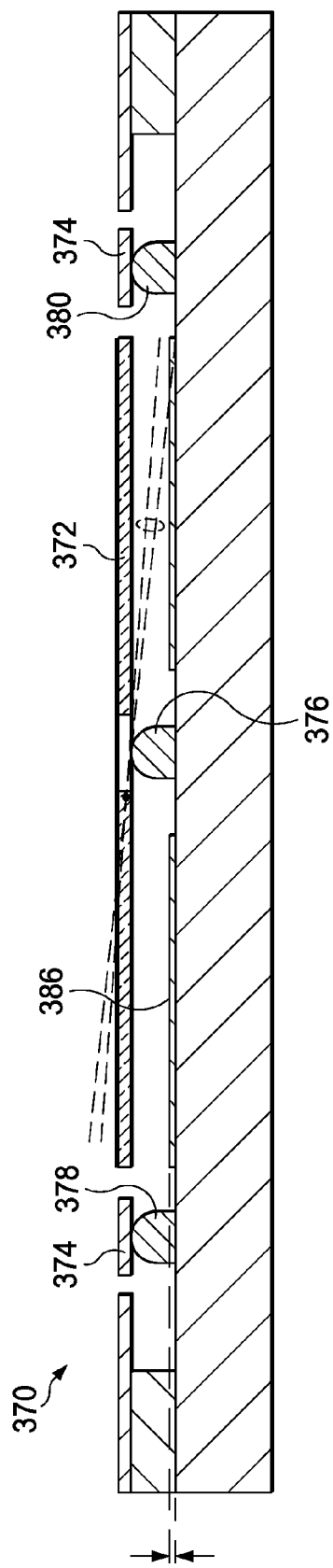
FIG. 18 illustrates an additional embodiment MEMS mirror structure.

FIG. 18 illustrates a cross-sectional view of mirror cell 370. Mirror 372 rolls over the bearing surface of pillar 376. In an example, mirror 372 is about 0.06 mm from electrode plate 386. Mirror 372 is a gold covered mirror with a diameter of 1 mm and a thickness of 0.02 mm. Gimbal ring 374 is supported by pillars 378 and 380. Gimbal ring 374 has a cross section of about 0.08 mm by 0.02 mm. In an example, the gimbal spring cross section of the folded torsion beam is about 0.02 mm by 0.0035 mm.

Figure 19:
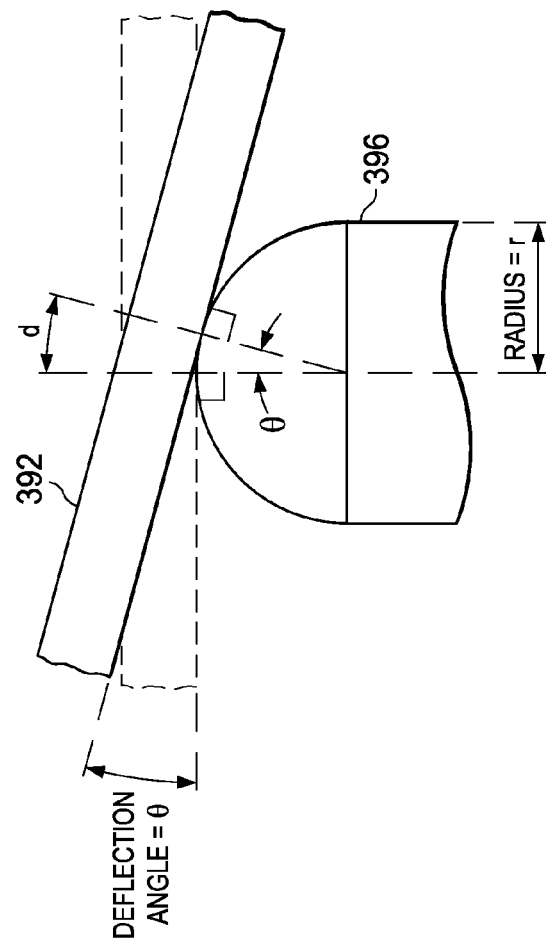
FIG. 19 illustrates an embodiment MEMS mirror structure.

There is a slight displacement of the mirror-pivot contact point on the pillar away from the mirror center as the deflection angle increases. FIG. 19 illustrates a rounded bearing surface for the mirror to roll over. Mirror 392 is on pillar 396, which has a radius r. Mirror 392 has a deflection angle θ and a deflection distance d. For small angles, $$d=2r\tan\theta/2.$$

FIG. 20 illustrates table 540 which shows the absolute value of the pivot movement across the mirror for various deflection angles and pivot radii in micrometers for the mirror-pivot surface system of FIG. 19. The pivot movement increases with both deflection angle and radius of the spherical surface. For up to six degrees, a spherical radius of 0.03 mm gives a 6.3 µm displacement, while a 0.02 mm radius gives a 4.2 µm displacement.

FIG. 20 also illustrates table 542 with the percentage change in deflection movement due to pivot migration, which determines the change in deflection sensitivity. A movement in the bearing contact point is permissible if the moment arm is not excessively changed and there is not significant sideways movement of the mirror center of rotation against the torsion spring axis point. A spherical radius of 0.03 mm gives a 1.8% shortening, while a 0.02 mm radius gives a 1.2% shortening of the moment arm causing the deflection at high deflections leading to a corresponding decrease in sensitivity at high deflections, where the mirror deflection is in any case more sensitive. Hence this effect provides a small amount of linearization to the system.

Figure 21:
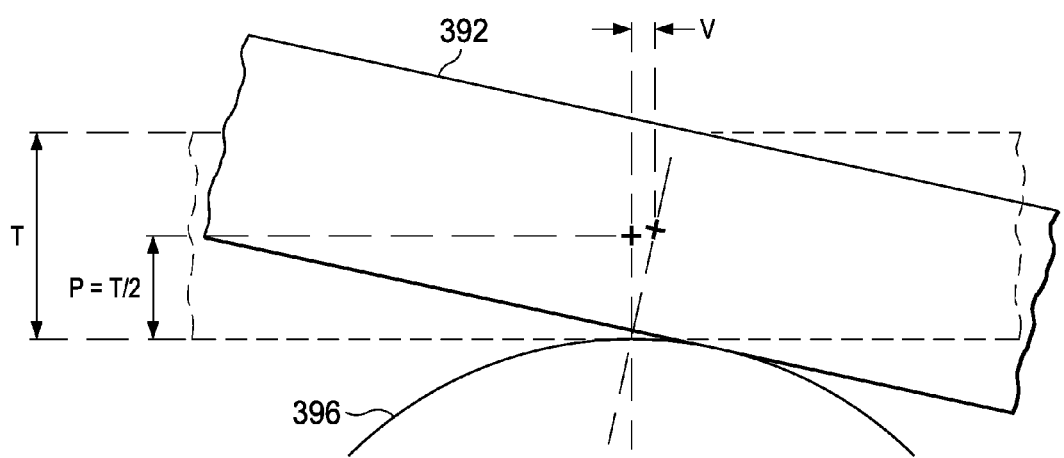
FIG. 21 illustrates another embodiment MEMS mirror structure.

FIG. 21 provides a detailed view of the lateral movement of the center of rotation of a MEMS mirror above a rounded pivot surface. Side displacement building up leads to side pressure from distortion of the torsion springs and possibly some sliding at the bearing surface, with the risk of stiction. Stiction is static friction which, when released, causes a sudden movement in the mirror.

Figure 22:
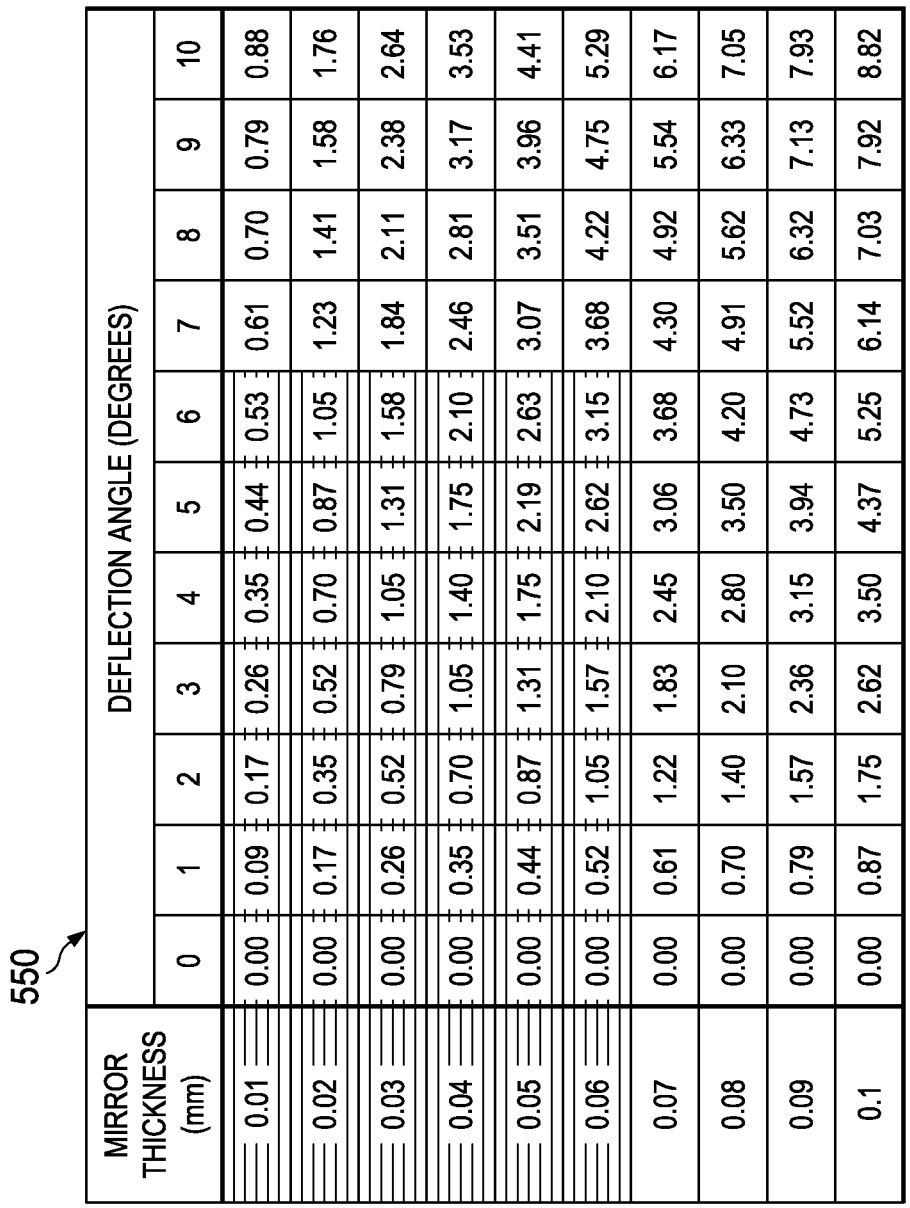
FIG. 22 illustrates a table of horizontal displacement of a pivot for deflection angle and mirror thickness.

FIG. 22 shows table 550 with the approximate horizontal displacement of the center of pivot point from the center of the pillar in micrometers. The dominant variables are the mirror thickness, leading to the height of the gimbal pivot point above the bearing surface, which is half that height, and the deflection angle. Table 550 shows the horizontal migration of the actual center of rotation of the mirror without sliding across the surface of the bearing. There is a buildup of lateral movement which increases both with deflection angle and with mirror thickness, but is largely independent of the radius of the pivot. For a six degree maximum deflection and a 0.06 mm mirror thickness, the lateral movement of the center of pivot is just over three micrometers, which may build up to a significant side force within the torsion springs, leading to mechanical slipping of the mirror across the spherical interface.

Figure 23:
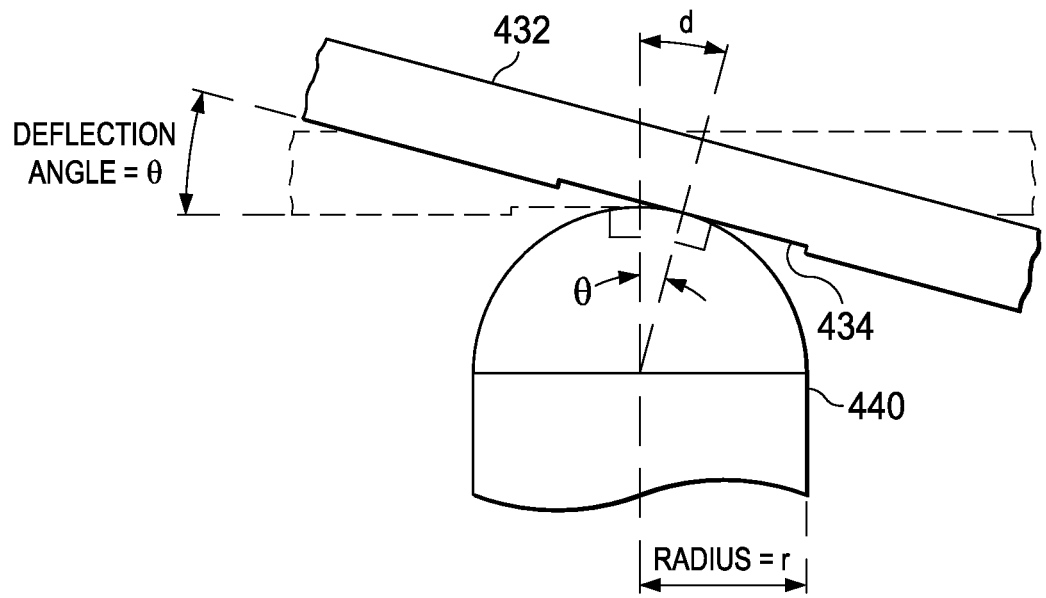
FIG. 23 illustrates an embodiment MEMS mirror structure with an indentation over the support pillar.

This lateral migration of the torsion spring pivot point may be reduced by placing the torsion spring pivot point at the same height as the underside contact point of the mirror or slightly below it. This may be achieved by thinning the springs by removing material from the top surface and thinning the central area of the mirror form the underside, as illustrated in FIG. 23. The thinning of the mirror has the advantage of making the mirror deflection more sensitive across the entire deflection range and allowing lower deflection voltages, and hence more overdrive for impulsive drive and kinetic energy management. Depression 434 in mirror 432 is over pillar 440. There is a displacement d of the center of pivot for an angle θ and pillar radius r.

Figure 24:
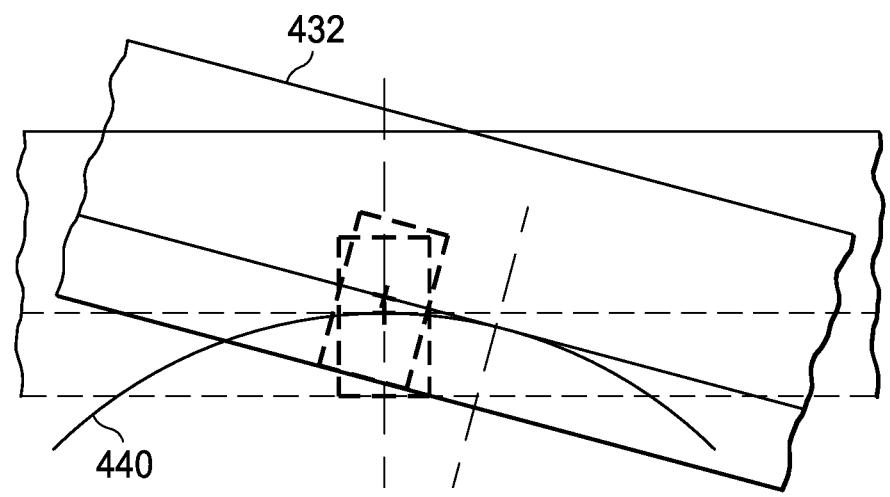
FIG. 24 illustrates an additional embodiment MEMS mirror structure for angle of deflection and radius of pivot.

FIG. 24 illustrates the torsion spring attachment, center of pivot, and geometry for primarily vertical movement of the pivot point. The position of the attachment point of the torsion spring to the mirror and the resultant center of rotation of that spring are illustrated. The pivot point for vertical migration is given by:

$$H = r((\cos\theta - 1) + (\sin\theta \cos\theta)).$$

The residual horizontal migration is given by:

$$H \tan\theta.$$

FIG. 25 illustrates the residual pivot migration. Table 540 shows the residual pivot vertical migration, in micrometers for the angle of deflection and radius of pivot. There is vertical movement of the pivot point, distorting the spring, and resulting in additional down-force on the bearing surface, but it is less than 0.3 μm for deflection angles of less than six degrees and up to about a 0.05 mm radius of pivot.

Table 542 shows the residual pivot horizontal migration, in micrometers, for angle of deflection and radius of pivot. For a six degree angle and a 0.03 mm radius sphere is under 0.02 μm, which is 52 times better than for a 0.02 mm thick un-thinned mirror, and 131 times better than a 0.06 mm thick un-thinned mirror.

At these levels of displacement, tens of nanometers, the level of side force is low, leading to a lack of slippage and stiction. Thinning the mirror back further and thinning the gimbal springs further may lead to more improvements. A mirror back thinned to around 33% and a gimbal spring thinning to 50% places the center of rotation of the gimbal springs below the at-rest contact point between the mirror and the spherical surface. Thus, the horizontal locus of the center of rotation moves first one way, then reverses direction to pass through zero, and moves the other way up to the maximum value at the maximum deflection of the mirror. For a maximum mirror deflection of six degrees, there is a horizontal deflection component of less than one third of the previous maximum deflection. For example, for a six degree maximum deflection and a 0.03 mm radius spherical bearing surface, the horizontal movement of the spring pivot point is limited to less than 6-7 nm.

While this description has treated the topic in one plane (e.g. the X-plane) the techniques can be extended into two planes (e.g. X, Y planes) and would for a mirror system steerable in both X and Y planes.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A micro-electro-mechanical-system (MEMS) mirror structure comprising:
   an electrode plate comprising a first deflection electrode and a second deflection electrode, wherein the second deflection electrode is opposite the first deflection electrode, wherein the first deflection electrode is configured to receive a first drive voltage, and wherein the second deflection electrode is configured to receive a second drive voltage;
   a mirror support pillar disposed on the electrode plate, wherein the mirror support pillar has a bearing surface; and
   a mirror disposed above the bearing surface of the mirror support pillar, wherein the mirror has a deflection angle, and wherein the first drive voltage is nonzero when the deflection angle is zero.

2. The MEMS mirror structure of claim 1, wherein the bearing surface of the mirror support pillar is spherical.

3. The MEMS mirror structure of claim 1, further comprising:
   a torsion spring coupled to the mirror; and
   a gimbal ring coupled to the torsion spring, wherein a height of the mirror support pillar is greater than a distance between the gimbal ring and the electrode plate.

4. The MEMS mirror structure of claim 3 wherein a first thickness of the gimbal ring is less than a second thickness of the mirror.

5. The MEMS mirror structure of claim 1, further comprising:
- a first torsion spring coupled to the mirror;
- a second torsion spring coupled to the mirror;
- a gimbal ring coupled to the first torsion spring and to the second torsion spring;
- a first gimbal ring support pillar disposed on the electrode plate and below the gimbal ring; and
- a second gimbal ring support pillar disposed on the electrode plate and below the gimbal ring.

6. The MEMS mirror structure of claim 5, wherein an imaginary line between the first gimbal ring support pillar and the second gimbal ring support pillar passes through the first deflection electrode and the second deflection electrode.

7. The MEMS mirror structure of claim 5, wherein the electrode plate further comprises a gimbal electrode, wherein the gimbal electrode is below the gimbal ring.

8. The MEMS mirror structure of claim 1, wherein a first MEMS mirror array comprises the MEMS mirror structure.

9. The MEMS mirror structure of claim 8, wherein a MEMS photonic switch comprises:
- a first collimator array;
- the first MEMS mirror array coupled to the first collimator array;
- a second MEMS mirror array coupled to the first MEMS mirror array; and
- a second collimator array coupled to the second MEMS mirror array.

10. The MEMS mirror structure of claim 1, further comprising a depression in an underside of the mirror over the mirror support pillar.

11. The MEMS mirror structure of claim 1, wherein the electrode plate further comprises a third deflection electrode and a fourth deflection electrode, wherein the third deflection electrode is opposite the fourth deflection electrode, and wherein a first imaginary line between the first deflection electrode and the second deflection electrode is perpendicular to a second imaginary line between the third deflection electrode and the fourth deflection electrode.

12. The MEMS mirror structure of claim 1, wherein the first drive voltage is nonzero and the second drive voltage is nonzero.

13. A micro-electro-mechanical-system (MEMS) mirror structure comprising:
- a mirror;
- a first torsion spring coupled to the mirror;
- a gimbal ring coupled to the first torsion spring;
- a first gimbal ring support pillar below the gimbal ring, wherein the gimbal ring is disposed on a pivot surface of the first gimbal ring support pillar; and
- an electrode plate coupled to the first gimbal ring support pillar.

14. The MEMS mirror structure of claim 13, further comprising a second gimbal ring support pillar coupled to the electrode plate, wherein the second gimbal ring support pillar is below the gimbal ring, wherein the first gimbal ring support pillar has a first bearing point, wherein the second gimbal ring support pillar has a second bearing point, and wherein an imaginary line from the first bearing point to the second bearing point is along an axis of rotation of the gimbal ring.

15. The MEMS mirror structure of claim 13, wherein the electrode plate comprises a gimbal electrode under the gimbal ring.

16. The MEMS mirror structure of claim 15, wherein the gimbal electrode is symmetrical about a pivot point of the gimbal ring.

17. The MEMS mirror structure of claim 13, wherein the electrode plate comprises a gimbal electrode, wherein the gimbal electrode is below the gimbal ring.

18. The MEMS mirror structure of claim 17, wherein the gimbal electrode is an annulus.

19. The MEMS mirror structure of claim 17, wherein the gimbal electrode is a portion of an annulus.

20. The MEMS mirror structure of claim 13, further comprising:
- a second torsion spring coupled between the gimbal ring and the mirror;
- a third torsion spring coupled to the gimbal ring; and
- a fourth torsion spring coupled to the gimbal ring, wherein an imaginary line between the first torsion spring and the second torsion spring is perpendicular to an imaginary line between the third torsion spring and the fourth torsion spring.

21. A method of controlling a micro-electro-mechanical-system (MEMS) mirror, the method comprising:
- preventing the MEMS mirror from moving closer to an electrode plate by using a mirror support pillar disposed on the electrode plate below the mirror; and
- preventing the MEMS mirror from moving farther from the electrode plate by applying a first voltage to a first deflection electrode of the electrode plate and a second voltage to a second deflection electrode of the electrode plate, wherein the first voltage is non-zero.

22. The method of claim 21, further comprising preventing a gimbal ring from moving closer to the electrode plate by using a first gimbal ring support pillar and a second gimbal ring support pillar disposed on the electrode plate.

23. The method of claim 22, further comprising rotating the gimbal ring.

24. The method of claim 22, further comprising preventing the gimbal ring from moving farther from the electrode plate by applying a third voltage to a gimbal electrode on the electrode plate.

* * * * *